United States Patent [19]

Capshew et al.

[11] 4,405,769

[45] Sep. 20, 1983

[54] CATALYST, METHOD OF PRODUCING THE CATALYST, AND POLYMERIZATION PROCESS EMPLOYING THE CATALYST

[76] Inventors: Charles E. Capshew; James N. Short; M. Bruce Welch, all of Bartlesville, Okla.; Richard E. Dietz, Borger, Tex.

[21] Appl. No.: 350,856

[22] Filed: Feb. 22, 1982

Related U.S. Application Data

[62] Division of Ser. No. 177,313, Aug. 12, 1980, Pat. No. 4,325,837.

[51] Int. Cl.$^3$ .......................... C08F 4/02; C08F 10/00
[52] U.S. Cl. ..................................... 526/119; 526/114; 526/116; 526/122; 526/125; 526/348.6; 526/352; 526/904
[58] Field of Search ............... 526/114, 116, 119, 122, 526/124, 125

[56] References Cited

U.S. PATENT DOCUMENTS

| | | | |
|---|---|---|---|
| 4,158,088 | 6/1979 | Iwao et al. | 526/903 |
| 4,187,385 | 2/1980 | Iwao et al. | 526/904 |
| 4,287,328 | 9/1981 | Kikuta et al. | 526/97 |
| 4,309,521 | 1/1982 | Sato et al. | 26/904 |
| 4,328,121 | 5/1982 | Capshew | 526/124 |

FOREIGN PATENT DOCUMENTS 2024832 1/1980 United Kingdom .

*Primary Examiner*—Edward J. Smith

[57] ABSTRACT

A transition metal compound and a metal halide compound are chemically combined to form a composition of matter. The composition of matter is rapidly mixed with a precipitating agent to form an active olefin polymerization catalyst.

17 Claims, 8 Drawing Figures

CATALYST, METHOD OF PRODUCING THE CATALYST, AND POLYMERIZATION PROCESS EMPLOYING THE CATALYST

CROSS REFERENCE TO RELATED APPLICATIONS

This is a divisional of copending application Ser. No. 177,313, filed Aug. 12, 1980 which issued as U.S. Pat. No. 4,325,837 on Apr. 20, 1982.

BACKGROUND OF THE INVENTION

The invention relates to catalysts, a method of producing the catalysts and a process using the catalysts. In another aspect the invention relates to a particularly effective ethylene polymerization catalyst and process.

In the production of polyolefins, such as for example polyethylene, polypropylene, ethylene-butene copolymers etc., an important aspect of the various processes and catalysts used to produce such polymers is the productivity. By productivity is meant the amount or yield of solid polymer that is obtained by employing a given quantity of catalyst. If the productivity is high enough then the amount of catalyst residues contained in the polymer is low enough that the presence of the catalyst residues does not significantly affect the properties of the polymer and the polymer does not require additional processing to remove the catalyst residues. As those skilled in the art are aware, removal of catalyst residues from polymer is an expensive process and is very desirable to employ a catalyst which provides sufficient productivity so that catalyst residue removal is not necessary.

In addition to productivity of a catalyst, another important aspect of a process and a catalyst is the properties of the polymer particles. It is desirable to produce polymer particles which are characterized by strength, uniformity of size, and relatively low fines. Although polymer fluff having relatively high percentages of fines can be handled with plant modifications, a polymer of high productivity and low fines is highly desirable.

Accordingly, an object of the invention is a catalyst.

Another object of the invention is a polymerization process for using the catalyst capable of providing excellent polymer productivities as compared to prior art catalysts.

Another object of the invention is a catalyst and a polymerization process in which the polymer produced contains catalyst residues in an amount so that catalyst residue removal is unnecessary.

Another object is a catalyst characterized by high productivity and low fines.

Another object is a polymerization process for using the catalyst capable of providing improved polymer productivities with low fines.

The invention can be understood by reference to the following description and the drawings in which FIG. 1 is a Scanning Electron Micrograph of polymer particles made with a catalyst according to the invention wherein the addition time was 10 minutes and the first and second catalyst components were mixed in the absence of an olefin atmosphere and without prepolymerization, at 100× magnification;

SUMMARY OF THE INVENTION

Figure 1:
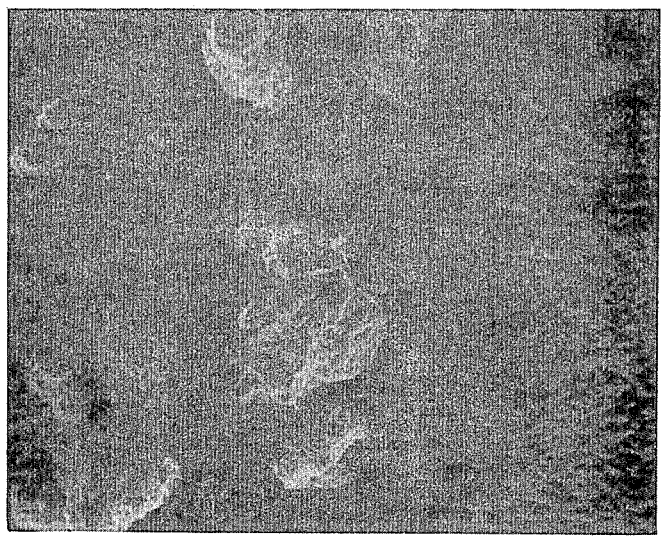

According to the invention a catalyst is provided which is prepared by mixing together a metal halide compound and a transition metal compound to produce a first catalyst component. The first catalyst component can be dissolved in a dry inert solvent to produce a first catalyst component solution. A second catalyst component comprising a precipitating agent as hereinafter defined is relatively rapidly mixed with the above-mentioned first catalyst component solution to produce a solid catalyst in the form of a slurry. By relatively rapidly is meant that the precipitating agent is added in a period of time (hereinafter referred to as "addition time") less than about 2 hours.

Further according to the invention a small but effective amount of olefin polymer can be prepolymerized on the solid catalyst.

Further according to the invention, the solid catalyst with or without prepolymer deposited thereon can be treated with a halide ion exchanging source as herein defined to produce a catalyst.

Further according to the invention the thus produced catalyst can have a small but effective amount of an olefin polymer deposited thereon.

Further according to the invention, the reaction of the first catalyst component and the second catalyst component can occur in an aromatic solvent under an olefin atmosphere and at a temperature in the range of about −100° C. to about 50° C.

Further according to the invention are methods of making the catalysts according to the invention.

Further according to the invention are polymerization processes utilizing catalysts according to the invention.

DETAILED DESCRIPTION OF THE INVENTION

The catalysts of the invention are produced by the procedure set out herein and include the step of adding the second catalyst component relatively rapidly to the first catalyst component solution. By relatively rapidly is meant the addition time is broadly less than about 2 hours since at addition times greater than about 2 hours no effects are seen in fines reduction during polymerization using the invention catalysts. Preferably the addition time is less than about 45 minutes, and most preferably in the range of about 5 to about 25 minutes because mixing periods in this range are highly successful in reducing fines produced during polymerization using the catalysts, though shorter periods can be used.

The catalysts of the invention can be produced by the procedure set out herein and can include the step of polymerizing a small amount of olefin as hereinafter described onto the precipitated solid catalyst following the precipitation step and/or onto the catalyst following the halide ion exchanging step. The polymer formed on the precipitate and/or on the catalyst is herein denoted "prepolymer" for convenience; the process of depositing polymer on the catalyst is denoted prepolymerization; and the catalyst having polymer deposited thereon is denoted a prepolymerized catalyst. The amount of prepolymer formed on the precipitate and/or on the catalyst can be from about 1% to about 50% or even higher by weight of the total composition. There is no exact upper limit to the amount of prepolymer which can be formed on the catalyst except as determined by the practicality of the situation. The lower limit is determined by an amount effective to reduce fines produced during polymerization using the catalyst to an acceptable level. Any amount of prepolymer can be expected in accordance with the invention to at least contribute to the reduction of polymer fines during polymerization using the catalyst. Preferably, however, the prepolymer can be in the range of about 1% to about 50% by weight based upon the weight of the total composition, because it has been found that catalysts having amounts of prepolymer greater than those in the range do not feed well in conventional catalyst feeders. More preferably, the prepolymer can comprise in the range of about 3% to about 40% by weight based upon the total composition, and most preferably between about 5% and about 20% by weight because catalysts having prepolymer in these ranges show good feeding characteristics and large reduction of polymer fines. The prepolymerization is further discussed below.

The catalyst of the present invention comprises a composition of matter resulting from the chemical combination of a metal halide compound and a transition metal compound wherein the metal halide compound is selected from metal dihalides and metal hydroxyhalides and the metal of the metal halide compound is selected from Group IIA and Group IIB metals of the Mendeleev Periodic Table and wherein the transition metal of the transition metal compound is selected from Group IVB and Group VB transition metals of the Mendeleev Periodic Table and the transition metal is bonded to at least one atom selected from oxygen, nitrogen and sulfur, and said oxygen, nitrogen and sulfur atoms are in turn bonded to a carbon atom of a carbon containing radical. As used herein by the term "Mendeleev Periodic Table" is meant the Periodic Table of the Elements as shown in the inside front cover of Perry, *Chemical Engineer's Handbook*, 4th Edition, McGraw Hill & Co. (1963).

As noted above the metal compound is selected from metal dihalide compounds and metal hydroxyhalide compounds and the metal of the metal halide compound is selected from Group IIA and Group IIB metals, such as for example beryllium, magnesium, calcium and zinc. Some suitable metal halide compounds include for example, beryllium dichloride, beryllium dibromide, beryllium hydroxyiodide, magnesium dichloride, magnesium bromide, magnesium hydroxychloride, magnesium diiodide, magnesium difluoride, calcium dichloride, calcium dibromide, calcium hydroxybromide, zinc dichloride, zinc difluoride, and zinc hydroxychloride. While metal hydroxyhalide compounds are known in the are, they are not as common and as readily available as metal dihalide compounds; therefore, metal dihalides are preferred. Of the metal dihalides, magnesium dihalides, and particularly magnesium dichloride is preferred because it is readily available and relatively inexpensive and has provided excellent results. The metal dihalide component is generally used in the form of an anhydrous, particulate solid to facilitate its reaction with the transition metal compound. It is also noted that various techniques for converting a metal halide compound to a fine particulate form, such as for example roll milling, reprecipitating, etc., can be used to prepare the metal halide compound for use according to the present invention and that such additional preparation of the metal halide compound promotes the reaction of the metal halide compound with the transition metal compound; however, it does not appear to make any difference in a catalyst of the present invention prepared from a composition of matter of the present invention if the metal halide compound is in a fine particulate form, that is, polymer productivity for example is not a function of the size of the particles of the metal halide compound. Preparation of metal hydroxyhalide compounds are described in K. Soga, S. Katano, Y. Akimoto and T. Kagiya, "Polymerization of alpha-Olefins with Supported Ziegler-type Catalysts", *Polymer Journal*, Vol. 2, No. 5, pp. 128–134 (1973).

The transition metal of the transition metal compound noted above is selected from Group IVB and Group VB transition metals and is generally selected from titanium, zirconium, and vanadium although other transition metals can be employed. Excellent results have been obtained with titanium compounds and they are preferred. Some of the titanium compounds suitable for use include for example titanium tetrahydrocarbyloxides, titanium tetraimides, titanium tetraamides and titanium tetramercaptides. Other transition metal compounds include for example zirconium tetrahydrocarbyloxides, zirconium tetraimides, zirconium tetraamides, zirconium tetramercaptides, vanadium tetrahydrocarbyloxides, vanadium tetraimides, vanadium tetraamides and vanadium tetramercaptides.

The titanium tetrahydrocarbyloxides are the preferred titanium compounds because they produce excellent results and are readily available. Suitable titanium tetrahydrocarbyloxide compounds include those expressed by the general formula $$Ti(OR)_4$$

wherein each R is individually selected from an alkyl, cycloalkyl, aryl, alkaryl, and aralkyl hydrocarbon radical containing from about 1 to about 20 carbon atoms per radical and each R can be the same or different. Titanium tetrahydrocarbyloxides in which the hydrocarbyl group contains from about 1 to about 10 carbon atoms per radical are most often employed because they are more readily available. Suitable titanium tetrahydrocarbyloxides include, for example, titanium tetramethoxide, titanium dimethoxydiethoxide, titanium tetraethoxide, titanium tetra-n-butoxide, titanium tetrahexyloxide, titanium tetradecyloxide, titanium tetraeicosyloxide, titanium tetracyclohexyloxide, titanium tetrabenzyloxide, titanium tetra-p-tolyloxide and titanium tetraphenoxide.

Of the titanium tetrahydrocarbyloxides, titanium tetraalkoxides are generally preferred and titanium tetraethoxide is particularly preferred because of the excellent results obtained employing this material. Titanium tetraethoxide is also generally available at a reasonable cost.

The molar ratio of the transition metal compound to the metal halide compound can be selected over a relatively broad range. Generally the molar ratio is within the range of about 10:1 to about 1:10, preferably between about 3:1 and 0.5:2, however, the most common molar ratios are within the range of about 2:1 to about 1:2. When titanium tetrahydrocarbyloxide and magnesium dichloride are employed to form a composition of matter of the invention, a molar ratio of titanium to magnesium of about 2:1 is presently recommended as most all the magnesium compound apparently goes into solution easily.

The metal halide compound and the transition metal compound employed in the present invention are normally mixed together by heating, e.g. refluxing, these two components together in a suitable dry (essential absence of water) solvent or diluent, which is essentially inert to these components and the product produced. By the term "inert" is meant that the solvent does not chemically react with the dissolved components such as to interfere with the formation of the product of the stability of the product once it is formed. Such solvents or diluents include, for example, n-pentane, n-hexane, n-heptane, methylcyclohexane, toluene, xylenes and the like. It is emphasized that aromatic solvents are preferred, such as for example xylene because the solubility of the metal halide compound and the transition metal compound is higher in aromatic solvents as compared to aliphatic solvents. It is also noted that as compared to aliphatic solvents the use of aromatic solvents, such as for example xylene, appears to improve production of larger polymer particles and/or polymer particles with improved resistance to attrition when the composition resulting from the chemical combination of the metal halide compound and the transition metal compound is used to produce a rapid addition polymerization catalyst as described herein. Generally the amount of solvent or diluent employed can be selected over a broad range. Usually the amount of solvent or diluent is within the range of about 1, more preferably about 20, 20 to about 100 cc per gram of metal dihalide. The temperature employed during the heating step can also be selected over a broad range. Normally the heating temperature is within the range of about 15° C. to about 150° C. when the heating step is carried out at atmospheric pressure. Obviously the heating temperatures employed would be higher if the pressure employed is above atmospheric pressure. The pressure employed during the heating step does not appear to be a significant parameter. The heating step insures rapid dissolution of solid metal halides. In addition to the above noted solvents or diluents, more polar solvents or diluents such as nitrobenzene and halogenated hydrocarbons, e.g. methylene chloride, chlorobenzene and 1,2-dichloroethane can be used, particularly when producing compositions of the invention having a molar ratio of the transition metal compound to the metal dihalide compound of other than 2:1. In addition, normal saturated alkanols, such as, for example, ethanol, n-butanol and the like, and saturated ethers particularly saturated cyclic ethers such as, for example, tetrahydrofuran, can be used alone or in combination with the previously mentioned solvents or diluents in producing prepolymerized catalyst compositions according to the invention. Mixed solvents or diluents, such as for example, a mixture of n-hexane and tetrahydrofuran having a volume/volume ratio of, for example, about 50/50 can be employed in solubilizing hydrocarbon-soluble metal dihalides which are relatively difficult to solubilize, such as, for example, zinc dichloride and the like. Other suitable mixtures of two or more of the above solvents to solubilize the reagents of the first catalyst component can of course also be used and can be readily determined by one of ordinary skill in the art.

Generally, the time required for heating these two components together is within the range of about 5 minutes to about 10 hours, although in most instances a time within the range of abut 15 minutes to about 3 hours is sufficient. Following the heating operation, the resulting solution can be filtered to remove any undissolved material or extraneous solid, if desired. The composition of matter of the present invention thus produced and which is in solution can be recovered from the solvent or diluent by crystallation or other suitable means.

It is also emphasized that the compositions of matter as herein defined are prepared in an oxygen free system e.g., absence of air as well as a dry system, i.e., absence of water. Generally a dry box is employed in small preparations as known in the art to prepare the compositions of the present invention usually employing a dry oxygen free nitrogen atmosphere.

With respect to the compositions of matter as herein defined the following example is provided for purposes of illustration.

EXAMPLE I (First Catalyst Component Preparation)

Preparation of a composition of the invention was carried out by reacting 2 moles of titanium tetraethoxide and 1 mole of magnesium dichloride in hydrocarbon solution. All mixing, filtering and washing operations were conducted in a dry box under a nitrogen atmosphere. Anhydrous, powdered magnesium dichloride amounting to 4.758 g (0.050 mole) was roll milled and mixed with 23.010 g (0.101 mole) of titanium tetraethoxide in 200 ml of dry n-heptane in a flask equipped for stirring and refluxing. Under a nitrogen purge, the mixture was stirred, heated to refluxing temperature, refluxed for 45 minutes and cooled to room temperature to yield a solution containing a very small amount of undissolved residue. The reaction mixture was suction filtered to remove the residue to obtain a clear, colorless solution. The solution contained in a flask was first cooled in an ice bath to a temperature of about 0° C. and then to a temperature of about −22° C. using a freezer to yield a relatively small crop of crystals. To increase the yield, the mother liquor was heated to boiling under a nitrogen purge to remove about ⅓ of the volume by evaporation. The resulting solution was cooled to room temperature, then −22° C. and finally to about −78° C. in a dry ice-isopropanol bath for about 1 hour. The mother liquor was pumped off the crystals that had formed and the crystals were rinsed off with three 20 ml portions of dry n-hexane cooled to about −78° C. The liquid remaining after the last rinse was pumped off and the product was dried overnight under a nitrogen purge to obtain 23.6 g of white crystals amounting to 85% of the theoretical yield.

Elemental analysis of a portion of the composition was performed with the following results, in terms of wt.%.

|  | C | H | Cl | Mg | Ti | O |
|---|---|---|---|---|---|---|
| Calculated | 34.84 | 7.32 | 12.85 | 4.41 | 17.37 | 23.21 |
| Found | 32.02 | 7.21 | 13.3 | 3.88 | 17.3 |  |

The results indicate that a composition having a formula consistent with $2Ti(OC_2H_5)_4 \cdot MgCl_2$ was found and recovered. Thus the composition apparently had a molar ratio of two moles of titanium to one mole of magnesium.

A sample of the white crystals was analyzed by powder X-ray diffraction under conditions to exclude the presence of air and water. The sample revealed the following characteristics:

TABLE I

| interplanar spacing (Meter × $10^{-10}$) | relative intensity of spectrum |
|---|---|
| 10.77 | weak |
| 10.47 | very strong |
| 9.28 | very weak |
| 8.73 | weak |
| 8.23 | very strong |
| 8.10 | moderate |
| 7.91 | very strong |
| 7.43 | strong |
| 7.27 | strong |
| 6.52 | weak |
| 6.41 | weak |
| 6.10 | weak |
| 4.90 | very weak |
| 4.42 | very weak |
| 4.40 | very weak |
| 4.09 | very weak |
| 3.86 | very weak |

The interplanar spacing lines were sharp and in view of the above number of interplanar spacings it is apparent that the composition formed has essentially a crystalline structure.

The catalysts of the present invention are made up of two components. The first catalyst component comprises a composition of matter as described above in Example I and preceding text, and the second catalyst component comprises a precipitating agent. Particularly effective catalysts have been obtained by treating the above-described catalyst comprising said first catalyst component and said second catalyst component with a halide ion exchanging source, such as for example titanium tetrahalide. For convenience, the designation "catalyst A" refers to those catalysts which have not been treated with a halide ion exchanging source and the term "catalyst B" refers to those catalysts which have been so treated. In other words, catalyst B is catalyst A which is treated with a halide ion exchanging source. It has also been found desirable to employ either catalyst A or catalyst B with a cocatalyst comprising an organometallic compound.

The metal halide compounds and the transition metal compounds suitable for producing the composition of matter of the present invention which is used as the first catalyst component of the present invention were described above as was the general and specific nature of the composition of matter. It is noted that the composition of matter of the present invention need not be recovered from the diluent or solvent, such as by crystallation, prior to using such material to produce the catalysts of the present invention. Good results have been obtained by employing the first catalyst component solution which was produced when the composition of matter was prepared as well as by employing composition of matter of the present invention recovered from the diluent or solvent.

The metal halide compound/transition metal compound solution or first component solution (which can be formed by dissolving the recovered composition of matter of the present invention in a suitable solvent or which can be formed initially without recovering the composition of matter from the solvent) can then be contacted with hydrocarbon solution containing the second component of the catalyst. A solid reaction product is formed which precipitates out of the solution.

The second catalyst component is a precipitating agent selected from the group consisting of organometallic compounds in which the metal is selected from metals of Groups I to III of the Mendeleev Periodic Table, metal halides and oxygen-containing halides of elements selected from Groups IIIA, IVA, IVB, VA, and VB of the Mendeleev Periodic Table, hydrogen halides, and organic acid halides expressed as

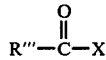

wherein R''' is an alkyl, aryl, cycloalkyl group or combinations thereof containing from 1 to about 12 carbon atoms and X is a halogen atom.

Some organometallic compounds in which the metal is selected from metals of Group I, Group II, and Group III of the Mendeleev Periodic Table suitable for use as the second component include, for example, lithium alkyls, Grignard reagents, dialkyl magnesium compounds, dialkyl zinc compounds, organoaluminum compounds, etc. The organometallic compound of the second catalyst component is generally an organoaluminum halide compound which includes for example, dihydrocarbylaluminum monohalides of the formula $R'_2AlX$, monohydrocarbylaluminum dihalides of the formula $R'AlX_2$ and hydrocarbylaluminum sesquihalides of the formula $R'_3Al_2X_3$ wherein each R' in the above formulas is individually selected from linear and branched chain hydrocarbyl radicals containing from 1 to about 20 carbon atoms per radical and can be the same or different and each X is a halogen atom and can be the same or different. Some suitable organoaluminum halide compounds include, for example, methylaluminum dibromide, ethylaluminum dichloride, ethylaluminum diiodide, isobutylaluminum dichloride, dodecylaluminum dibromide, dimethylaluminum bromide, diethylaluminum chloride, diisopropylaluminum chloride, methyl-n-propylaluminum bromide, di-n- octylaluminum bromide, diphenylaluminum chloride, dicyclohexylaluminum bromide, dieicosylaluminum chloride, methylaluminum sesquibromide, ethylaluminum sesquichloride, ethylaluminum sesquiiodide, and the like. Ethylaluminum sesquichloride, ethylaluminum dichloride, and diethylaluminum chloride have been employed with good results and are preferred. The most preferred organoaluminum halide compound is ethylaluminum sesquichloride, which produced the best results.

Some metal halides and oxygen-containing halides of elements selected from Groups IIIA, IVA, IVB, VA, and VB suitable for use as the second component preferably include such as, for example, aluminum tribromide, aluminum trichloride, aluminum triiodide, tin tetrabromide, tin tetrachloride, silicon tetrabromide, silicon tetrachloride, phosphorus oxychloride, phosphorous trichloride, phosphorous pentabromide, vanadium tetrachloride, vanadium oxytrichloride, vanadyl trichloride, zirconium tetrachloride, and the like.

The hydrogen halides suitable for use as the second catalyst component include preferably such as, for example, hydrogen chloride, hydrogen bromide, and the like.

The organic acid halides suitable for use as the second catalyst component preferably include such as, for example, acetyl chloride, propionyl fluoride, dodecanoyl chloride, 3-cyclopentylpropionyl chloride, 2-naphthoyl chloride, benzoyl bromide, benzoyl chloride, and the like.

The molar ratio of the transition metal compound of the first catalyst component to the second catalyst component can be selected over a relatively broad range. Generally, the molar ratio of the transition metal of the first catalyst component to the second catalyst component is within a range of from about 10:1 to about 1:10 and more generally within a range of about 2:1 to about 1:3 since a molar ratio within the latter range usually produces a catalyst which can be employed as an especially active ethylene polymerization catalyst.

According to the rapid addition aspect of the invention, the concentration of the reactants can also play a role because below a certain concentration little effect has been observed in the reduction of polymer fines while at the upper limit of the range solubilities can become limiting. Broadly, the concentration of the metal halide can range from about 0.2 M to about 1.2 molar; the concentration of the transition metal compound can vary in accordance with the description herein; and the concentration of the precipitating agent as added in accordance with the invention; to the mixture can range from about 0.2 M to pure, undiluted agent. Preferably, the metal halide can range from about 0.3 M to about 0.6 M, and the precipitating agent as added can range from about 0.4 M to about 1.6 M. Most preferred because of excellent results is the system wherein the metal halide is in the range of about 0.35 M to about 0.45 M, and the precipitating agent as added is in the range of about 0.6 M to about 1.0 M.

The temperature employed while mixing the first and second catalyst components as above described can be selected over a broad range. Generally the temperature employed is within a range of about −100° C. to about 50° C. or higher, while temperatures within the range of about 0° C. to about 30° C. or somewhat higher were most often employed, most preferably about 20° C. to 30° C. or somewhat higher or room temperature. Since heat is evolved when the first catalyst component and the second catalyst component are mixed, the mixing rate is adjusted as required and additional cooling is employed if needed in order to maintain a relatively constant mixing temperature. It is noted with respect to mixing the first and second components that the order of addition is not important and either component can be added to the other or both can be added simultaneously and/or stoichiometrically to a common vessel. After completing the mixing, the resulting slurry is stirred or agitated for a sufficient time, generally within a range of about 15 minutes to about 5 hours to insure that mixing of the components is complete. It is recommended that the stirring or agitation be carried out whereby the slurry is maintained at the mixing temperature for the first 5 to about 30 minutes after mixing or more preferably from about 5 minutes to about 20 minutes. Thereafter, stirring can be discontinued and the solid product recovered by filtration, decantation, and the like. The product can then be washed with a suitable material such as a hydrocarbon, e.g., n-pentane, n-heptane, cyclohexane, benzene, xylenes and the like, to remove any soluble material which may be present. The product can then be dried and stored under dry nitrogen. The products formed in this manner are designated as catalyst A as peviously described.

The catalysts of the invention are produced by the procedure set out herein and include the step of adding the second catalyst component relatively rapidly to the first catalyst component solution. As indicated above, by relatively rapidly is meant the addition time is broadly less than about 2 hours since at addition times greater than about 2 hours no effects are seen in fines reduction during polymerization using the invention catalysts. Preferably the addition time is less than about 45 minutes, and most preferably in the range of about 5 to about 25 minutes, although even shorter times can be used with good results, because mixing periods in this range are highly successful in reducing fines produced during polymerization using the catalysts, though shorter periods can be used.

As indicated above, the catalysts of the invention are produced by the procedures set out herein and can include the step of mixing the first catalyst component solution and the second catalyst component under an olefin atmosphere.

The olefin atmosphere employed during preparation of the catalyst can be an aliphatic mono-1-olefin having from 2 to about 18 carbon atoms per molecule. Thus, the olefin can include such as, for example, ethylene, propylene, 1-butene, 1-pentene, 1-hexene, 1-heptene, 1-octene, 1-nonene and 1-decene and mixtures of one or more thereof. When ethylene homopolymer is to be produced with the invention catalyst, generally an ethylene atmosphere is preferred during catalyst preparation. When ethylene copolymers are to be produced with the invention catalyst, it is sometimes desirable to use the same 1-olefin to furnish the atmosphere in catalyst manufacture that will be used in producing the copolymer product. However, this is not required; and other mono-1-olefins or even dienes such as are suitable for polymerization using the invention catalysts set out below can also be employed.

The olefin atmosphere can be provided by purging the catalyst preparation vessel with olefin and then continuing the addition of olefin to provide in the vessel from about 1, or even lower, more preferably from about 10 to about 1000 psia (0.069–6.9 MPa) since at much less than about 10 psia the concentration of dissolving olefin in the solution is negligible and higher pressures can require high pressure equipment. Preferably, the pressure is from about 15 to about 100 psia (0.10-0.69 MPa) of the olefin since pressures in this range provide a good, controllable reaction consistant with good deposition of prepolymer on the catalyst.

As indicated, the catalysts of the invention are produced by the procedure set out herein and can include the step of carrying out the rapid addition of the second catalyst component to the first catalyst component solution in an aromatic solvent such as, for example, xylene and the aromatic solvents set forth above as suitable for the mixing of the first catalyst component and the second catalyst component.

According to the invention, prepolymer can be prepolymerized onto the composition formed by the reaction between the first component and the second component and the prepolymerized catalyst composition can be recovered and used in polymerization processes.

The prepolymerization step can comprise, as indicated above, prepolymerizing a minor but effective amount of aliphatic olefin onto the precipitate produced by the reaction between the first component and the second component.

The prepolymerizing step can be performed by any method effective for prepolymerizing polymer onto the precipitate. For example, the precipitating step can be entirely carried out under an olefin atmosphere; or the precipitating step can be carried out by adding a portion of the precipitating agent under a dry inert atmosphere followed by adding another portion of the precipitating agent under an olefin atmosphere; or other variations can be employed by one skilled in the art in accordance with the invention. Preferably, the prepolymerizing step is carried out by adding the precipitating agent under an olefin atmosphere, for example, ethylene, to the first component with stirring and recovering the precipitate, preferably with washing although not necessarily. Prepolymerized catalysts prepared in this manner provide low fines content polymer when used in polymerization.

Olefins as herein described, such as, for example, aliphatic mono-1-olefins, for example, ethylene, can be prepolymerized onto the catalysts of the present invention without great difficulty. However, such prepolymerizations require not only an adequate amount of cocatalyst as herein described below for polymerization using the catalysts of the invention, for example, triethylaluminum and the like, but also a substantive time to allow prepolymerization to proceed. The amount of cocatalyst required can be readily determined according to the invention from the description and the examples set out below.

The monomer which is utilized for prepolymerization can be the same as or different from the monomer used in polymerization as set out herein. Preferably the same monomer can be used. The aliphatic mono-1-olefins can preferably have between 2 and 10 carbon atoms per molecule and broadly between 2 and about 18 carbon atoms per molecule. Prepolymerization can also use conjugated diolefins, preferably such as having from 4 to 8 carbon atoms per molecule. Most preferably ethylene is used for prepolymerization.

The weight of prepolymer based on the total weight of the composition, as indicated above, is preferably from about 1 to about 50% by weight of the total composition, more preferably from about 3% to about 40% by weight, and most preferably from about 5% to about 20% by weight of the total composition since this results in a catalyst with good feeding characteristics that can produce a polymer having relatively low fines content.

In one embodiment of the invention, the prepolymerized catalyst A composition formed by the relatively rapid reaction between the first catalyst component and the second catalyst component can be recovered after deposition of prepolymer thereon and used in polymerization preferably in combination with a cocatalyst comprising an organometallic compound as herein defined.

While it may not be necessary in all instances to employ a cocatalyst with the catalyst of the present invention, the use of cocatalysts is recommended for best results. The organometallic cocatalysts suitable for use in accordance with the invention are the same as the organometallic compounds suitable for use as the second component of the catalyst of the present invention previously described and in addition to organometallic compounds represented by the general formulsa $R''AlX_2$, $R''_2AlX$ and $R''_3Al_2X_3$, suitable cocatalysts also include compounds of the formula $R''_3Al$ in which $R''$ is the same as $R'$ defined above. Of the organometallic cocatalysts, the organoaluminum cocatalysts are preferred and in addition to those described above as suitable for use as the second component of the catalyst the additional organoaluminum compounds of the formula $R''_3Al$ include, for example, trimethylaluminum, triethylaluminum, triisopropylaluminum, tridecylaluminum, trieicosylaluminum, tricyclohexylaluminum, triphenylaluminum, 2-methylpentyldiethylaluminum, and triisoprenylaluminum. Triethylaluminum is preferred since this compound produced excellent results in the runs hereafter described.

According to another aspect of the invention, catalyst A which does not have prepolymer deposited thereon can be treated with a halide ion exchanging source such as for example a halide of a transition metal in order to produce a catalyst of enhanced activity, referred to generally as catalyst B. The term "halide ion exchanging source" is herein used for convenience; however, it is not intended thereby to limit the invention by the theory whereby the action of such compounds can be explained. Rather, the invention encompasses the compounds used whatever the theory of action may be. The catalyst B can then have prepolymer deposited thereon in accordance with the invention. Some examples of suitable halide ion exchanging sources that can be employed are titanium tetrahalides, such as titanium tetrachloride, vanadium oxychloride, and zirconium tetrachloride. Because titanium tetrachloride is readily available and produced excellent results after somewhat extensive experimentation, it is preferred.

Generally, treating the nonprepolymerized catalyst A with the halide ion exchanging source takes place in a suitable diluent such as a hydrocarbon diluent, for example, n-pentane, n-heptane, cyclohexane, benzene, xylenes, and the like, to facilitate the treating process. The treating temperature can be selected over a relatively broad range and is normally within a range of about 0° C. to about 200° C.; however, temperatures about 20° C. to about 30° C. or room temperature are currently preferred.

According to the present invention wherein rapid addition of the first catalyst component and the second catalyst component is employed, both the addition temperature and the treating temperature are preferably in the range of about 20° C. to 30° C. or room temperature.

The treating time for the halide ion exchanging source can also be selected over a broad range and generally is within the range of about 10 minutes to about 10 hours. While the weight ratio of the halide ion exchanging source to catalyst A can be selected over a relatively broad range, the weight ratio of the halide ion exchanging source to catalyst A is generally within a range of about 10:1 to about 1:10 and more generally from about 7:1 to about 1:4. Following the treatment of catalyst A with the halide ion exchanging source the surplus halide ion exchanging source (the halide ion exchanging source which is not bound to catalyst B) is removed by washing catalyst B with a dry (essential absence of water) liquid such as a hydrocarbon of the type previously disclosed, n-hexane, or xylene for example.

After treatment of the nonprepolymerized catalyst A composition with the halide ion exchanging source, the reaction product can have prepolymer deposited thereon in accordance with the invention. For example, the reaction product can be separated from a reaction mix or diluent and prepolymer deposited thereon in accordance with the procedure set forth above for depositing prepolymer on catalyst A compositions.

The resulting product, prepolymerized catalyst B after drying, can be stored under an inert atmosphere, such as dry nitrogen. It is found in general that catalyst B can be stored for a month or longer without significant decrease in activity.

According to another aspect of the invention catalyst A which has had prepolymer deposited thereon can be treated with a halide ion exchanging source, such as, for example, a halide of a transition metal in order to produce a catalyst of enhanced activity. One example of a preferable halide ion exchanging source of those set out generally above is titanium tetrachloride, because titanium tetrachloride is readily available and produced excellent results. In general the treatment of prepolymerized catalyst A with the halide ion exchanging source can be carried out as indicated above for the treatment of nonprepolymerized catalyst A. However, to some extent, the temperature at which the halide ion exchanging treatment is carried out will depend upon the time when prepolymer is deposited on the catalyst. Thus when prepolymer is applied to the catalyst prior to the halide ion exchanging source treatment step, then the temperature used during the halide ion exchanging source treatment is preferably generally below about 100° C., more preferably from about 15° C. to about 90° C., most preferably from about 15° C. to about 50° C., to avoid dissolving the prepolymer in the hydrocarbon solution containing the halide ion exchanging source, such as, for example titanium tetrachloride, and the like. Treating with the halide ion exchanging source at a temperature in the range of about 20° C. to about 30° C. is currently particularly preferred for convenience.

According to yet other aspects of the invention the product obtained by treatment of prepolymerized catalyst A with the halide ion exchanging source can have prepolymer deposited thereon, thereby producing catalyst B having prepolymer twice deposited thereon.

If desired, any catalyst A or catalyst B according to the invention can be admixed with a particulate diluent such as, for example, silica, silica-alumina, silica-titania, magnesium dichloride, magnesium oxide, polyethylene, polypropylene, and poly(phenylene sulfide), prior to using the catalyst in a polymerization process. While the weight ratio of the particulate diluent to catalyst can be selected over a relatively wide range, the weight ratio of particulate diluent to catalyst generally is within the range of about 100:1 to about 1:100. More often, the weight ratio of particulate diluent to catalyst is within the range of about 20:1 to about 2:1 and use of a particulate diluent has been found effective to facilitate charging of the catalyst to the reactor.

While it may not be necessary in all instances to employ a cocatalyst with the catalyst of the present invention, the use of cocatalysts is recommended for best results. The organometallic cocatalysts suitable for use in accordance with the invention are the same as the organometallic compounds suitable for use as the second component of the catalyst of the present invention previously described and in addition to organometallic compounds represented by the general formula $R''AlX_2$, $R''_2AlX$ and $R''_3Al_2X_3$, suitable cocatalysts also include compounds of the formula $R''_3Al$ in which $R''$ is the same as $R'$ defined above. Of the organometallic cocatalysts, the organoaluminum cocatalysts are preferred and in addition to those described above as suitable for use as the second component of the catalyst the additional organoaluminum compounds of the formula $R''_3Al$ include, for example, trimethylaluminum, triethylaluminum, triisopropylaluminum, tridecylaluminum, trieicosylaluminum, tricyclohexylaluminum, triphenylaluminum, 2-methylpentyldiethylaluminum, and triisoprenylaluminum. Triethylaluminum is preferred since this compound produced excellent results in the runs hereafter described.

The molar ratio of the organometallic compound of the cocatalyst to the transition metal compound of the first catalyst component is not particularly critical and can be selected over a relatively broad range. Generally, the molar ratio of the organometallic compound of the cocatalyst to the transition metal compound of the first catalyst component is within a range of about 1:1 to about 1500:1.

A variety of polymerizable compounds are suitable for use in the process of the present invention. Olefins which can be homopolymerized or copolymerized with the invention catalysts include aliphatic mono-1-olefins. While the invention would appear to be suitable for use with any aliphatic mono-1-olefin, those olefins having 2 to 18 carbon atoms are most often used. The mono-1-olefins can be polymerized according to the present invention employing either a particle form process, a solution form process, or a gas phase process. Aliphatic mono-1-olefins can be copolymerized with other 1-olefins and/or with other smaller amounts of other ethylenically unsaturated monomers, such as 1,3-butadiene, isoprene, 1,3-pentadiene, styrene, alpha-methylstyrene, and similar ethylenically unsaturated monomers which do not impair the catalyst.

The catalysts of this invention can also be utilized to prepare homopolymers and copolymers of conjugated diolefins. Generally the conjugated diolefins contain 4 to 8 carbon atoms per molecule. Examples of suitable conjugated diolefins include 1,3-butadiene, isoprene, 2-methyl-1,3-butadiene, 1,3-pentadiene, and 1,3-octadiene. Suitable comonomers, besides the conjugated diolefins listed above include mono-1-olefins previously described and vinylaromatic compounds generally. Some suitable vinylaromatic compounds are those having from about 8 to about 14 carbon atoms per molecule, and include for example styrene and various alkylstyrenes, such as 4-ethylstyrene and such as 1-vinyl-naphthalene.

The weight percent of the conjugated diolefin in the copolymerization mixture can be selected over a relatively broad range. Generally the weight percent of the conjugated diolefin is from about 10 to about 95 weight percent and the other comonomers are from about 90 to about 5 weight percent. However, the weight percent of the conjugated diolefin is preferably from about 50 to about 90 weight percent and the other comonomers are from about 50 to about 10 weight percent.

In one aspect of the invention, the catalysts of the present invention have been found to be particularly effective for polymerization of mono-1-olefin such as ethylene as extremely high productivities have been obtained and thus mono-1-olefins such as ethylene are the preferred monomers for use with the catalysts of the present invention.

The polymerization process according to the present invention employing the catalysts and cocatalysts as above described can be performed either batchwise or continuously. In a batch process, for example, a stirred autoclave is prepared by first purging with nitrogen and then with a suitable compound, such as isobutane for example. When the catalyst and cocatalyst are employed either can be charged to the reactor first or they can be charged simultaneously through an entry port under an isobutane purge. After closing the entry port, hydrogen, if used is added, and then a diluent such as isobutane is added to the reactor. The reactor is heated to the desired reaction temperature, which for polymerizing ethylene, for example, is, for best results, generally within a range of about 50° C. to about 120° C. and the ethylene is then admitted and maintained at a partial pressure within a range of about 0.5 MPa to about 5.0 MPa (70-725 psig) for best results. At the end of the designated reaction period, the polymerization reaction is terminated and the unreacted olefin and isobutane are vented. The reactor is opened and the polymer, such as polyethylene, is collected as a free-flowing white solid and is dried to obtain the product.

In a continuous process, for example, a suitable reactor such as a loop reactor is continuously charged with suitable quantities of solvent or diluent, catalyst, cocatalyst, polymerizable compounds and hydrogen if any and in any desirable order. The reactor product is continuously withdrawn and the polymer recovered as appropriate, generally by flashing the diluent (solvent) and unreacted monomers and drying the resulting polymer.

The olefin polymers made with the catalysts of this invention are useful in preparing articles by conventional polyolefin processing techniques such as injection molding, rotational molding, extrusion of film, and the like. For example, polyethylene made with the catalysts of this invention is typically of narrow molecular weight distribution which is especially desirable for injection molding applications. Furthermore, the polyethylene produced as described generally has a desirable high bulk density of about 0.44 g/cc as recovered from the polymerization zone. In addition, the polyethylene produced as described is characterized by a high degree of stiffness, e.g. high flexural modulus, which is also desirable in many applications. Also, the polyethylene particles produced is characterized by low fines content.

EXAMPLE II

Catalyst Preparation

Catalyst A

All mixing and filtering operations were performed in a dry box (essential absence of air, i.e. oxygen, and water) under a dry nitrogen atmosphere employing dry n-heptane as the reaction medium. Anhydrous magnesium dichloride and titanium tetraethoxide (unless otherwise noted) were charged to a flask equipped for refluxing and stirring the contents of the flask. The mixture was brought to reflux temperature (about 100° C.), refluxed for the time shown in Table 2, cooled and filtered if extraneous or undissolved material was present. The product was cooled in an ice bath and the indicated organoaluminum halide compound was added to the product at a rate sufficient to avoid a significant temperature rise to produce a slurry. The resulting slurry was stirred about 30 minutes after removal of the flask from the ice bath. The slurry was filtered to produce a filter cake which was washed with portions of dry n-hexane and dried under a nitrogen purge to produce the product.

The quantities of the materials employed, weight and mole ratios of reactants charged and results obtained are given in Table 2.

TABLE 2

| PREPARATION OF CATALYSTS (Catalyst A) | | | | | | | | | | |
|---|---|---|---|---|---|---|---|---|---|---|
| Catalyst Designation | A-1 | A-2 | A-3 | A-4 | A-5 | A-6 | A-7 | A-8 | A-9 | A-10 |
| MgCl$_2$ | | | | | | | | | | |
| Grams | 0.950 | 9.518 | 0.955 | 2.856 | 2.856 | 0.952 | 0.952 | 9.516 | 0.952 | 0.952 |
| mole | 0.010 | 0.100 | 0.010 | 0.030 | 0.030 | 0.010 | 0.010 | 0.100 | 0.010 | 0.010 |
| Ti(OR)$_4$[1] | | | | | | | | | | |
| grams | 4.460 | 45.59 | 4.554 | 13.673 | 13.673 | 4.540 | 4.540 | 45.60 | 3.403 | 4.54 |
| mole | 0.0196 | 0.200 | 0.020 | 0.060 | 0.060 | 0.020 | 0.020 | 0.200 | 0.010 | 0.02 |
| 2nd Catalyst Component | | | | | | | | | | |
| Type | EASC[2] | EASC[2] | EADC[3] | EADC[3] | DEAC[4] | DEAC[4] | i-BADC[5] | EASC[2] | EASC[2] | EASC[2] |
| ml | 17.5 | 250 | 13.5 | 27 | 52 | 26.5 | 16.7 | 250 | 12.5 | 12.0 |
| mole | 0.0140 | 0.200 | 0.020 | 0.040 | 0.0393 | 0.020 | 0.020 | 0.200 | 0.010 | 0.01 |
| Reaction Diluent[7] | | | | | | | | | | |
| ml | 30 | 550 | 60 | 150 | 150 | 60 | 60 | 530 | 60 | 50 |
| Reflux, Min. | 20 | 45 | 60 | 60 | 60 | 60 | 60 | 60 | 80 | 45 |
| Wash Liquid[6] | | | | | | | | | | |
| ml | 50 | 600 | 40 | 50 | 50 | 60 | 50 | 250 | 30 | 30 |
| Mole Ratios | | | | | | | | | | |
| Ti/Mg | 1.96:1 | 2:1 | 2:1 | 2:1 | 2:1 | 2:1 | 2:1 | 2:1 | 1:1 | 2:1 |
| Ti/2nd catalyst comp. | 1.4:1 | 1:1 | 1:1 | 1.5:1 | 1.53:1 | 1:1 | 1:1 | 1:1 | 1:1 | 2:1 |
| Recovered Product | | | | | | | | | | |
| grams | 2.948 | 25.54 | 2.925 | 3.136 | 2.868 | 2.615 | 2.828 | 29.440 | 1.350 | 3.250 |
| Color | off-white | brown | white | pink- | lt. brown | cream | white | lt. brown | lt. brown | lt. yellow |

TABLE 2-continued

| PREPARATION OF CATALYSTS (Catalyst A) | | | | | | | | | | |
|---|---|---|---|---|---|---|---|---|---|---|
| Catalyst Designation | A-1 | A-2 | A-3 | A-4 | A-5 | A-6 | A-7 | A-8 | A-9 | A-10 |
| | | | | brown | | | | | | |

Notes:
[1]Ti(OR)$_4$ in catalysts A-1 through A-8 and A-10 was Ti(OC$_2$H$_5$)$_4$. In catalyst A-9, it was Ti(O n-C$_4$H$_9$)$_4$.
[2]EASC is ethylaluminum sesquichloride, 25 wt. % in n-heptane.
[3]EADC is ethylaluminum dichloride, 25 wt. % in n-hexane.
[4]DEAC is diethylaluminum chloride, 12.96 wt. % in n-hexane.
[5]i-BADC is isobutylaluminum dichloride, 25.4 wt. % in n-hexane.
[6]n-Hexane.
[7]n-Heptane.

EXAMPLE III

Catalyst Preparations

Catalyst B

All mixing and filtering operations were conducted in a dry box under a nitrogen atmosphere employing dry n-hexane as the reaction medium. To a flask equipped for stirring was charged the n-hexane, catalyst A and titanium tetrachloride. Generally, each mixture was stirred about 1 hour at ambient temperature, e.g., about 25° C., and then filtered. The filter cake was washed with portions of dry n-hexane and dried under a nitrogen purge. The dry powdery product was sieved through a 50 mesh screen to remove the larger particles.

The quantities of components employed, weight ratios of catalyst A to TiCl$_4$ and results obtained are given in Table 3.

tration increased 1.1 wt. % and chlorine concentration increased 15.3 wt. % at the expense of carbon, hydrogen and oxygen in particular.

From the above results it is believed that the halide ion exchanging source, which in this instance was titanium tetrachloride, caused an exchange of chloride for ethoxide groups in the catalyst. However, the invention is not limited by such a theory because regardless of the theory by which the present invention can be explained, an effective catalyst composition is produced.

Catalysts A-2 and B-2 were also examined by powder X-ray diffraction and X-ray photoelectron spectroscopy to measure the surface composition and bulk crystalline phases.

The results indicated no significant differences in the elemental composition of the surface within experimental error. However, Catalyst B-2 appeared to be amorphous whereas catalyst A-2 appeared to have a highly

TABLE 3

| PREPARATION OF CATALYSTS (Catalyst B) | | | | | | | | |
|---|---|---|---|---|---|---|---|---|
| Catalyst | Catalyst A | | TiCl$_4$ | Weight Ratio | Hydrocarbon Used ml. | | Reaction Time | Recovered Product | |
| Designation | No. | grams | grams | TiCl$_4$/Catalyst A | Reaction Diluent | Wash | Min. | grams | Color |
| B-1 | A-1 | 1.014 | 4.992 | 4.9:1 | 20 | 20 | 60 | 0.796 | grayish |
| B-2[8] | A-2 | 25.140 | 129.450 | 5.1:1 | 460 | 500 | 75 | 25.540 | brown |
| B-3 | A-3 | 1.000 | 5.000 | 5:1 | 20 | 30 | 60 | 0.771 | grayish |
| B-4 | A-4 | 0.984 | 5.000 | 5.1:1 | 20 | 30 | 25 | 0.790 | grayish |
| B-5 | A-5 | 1.000 | 5.000 | 5:1 | 20 | 30 | 60 | 1.025 | lt. brown |
| B-6 | A-6 | 1.000 | 5.000 | 5:1 | 20 | 30 | 60 | 0.870 | grayish |
| B-7 | A-7 | 1.000 | 5.000 | 5:1 | 20 | 30 | 60 | 0.695 | white |
| B-8[9] | A-8 | 25.440 | 146.710 | 5.8:1 | 550 | 300 | 60 | 27.498 | brown |
| B-9 | A-9 | 1.210 | 6.000 | 5:1 | 20 | 20 | 60 | 1.095 | lt. brown |
| B-10 | A-10 | 2.000 | 10.000 | 5:1 | 40 | 45 | 60 | 1.639 | yellow-brown |

Notes:
[8]21.040 grams of recovered product were diluted with 84.054 grams of 50 mesh polyethylene fines dried in a vacuum oven and the mixture was roll milled overnight (approx. 13 hours). Mixed catalyst consists of about 1 part by weight active component and 4 parts by weight diluent. The mixture was kept under N$_2$.
[9]27.498 grams of recovered product were diluted with 108.502 grams of dry polyethylene fines and processed as described in footnote (8). The mixture was kept under N$_2$. Mixed catalyst consists of about 1 part by weight active component and 3.95 parts by weight diluent.

Elemental analyses of catalysts A-2 and B-2 (not mixed with polyethylene fines) were performed and the results obtained are shown below in terms of wt. % of each element:

| Element | Catalyst A-2 | Catalyst B-2 |
|---|---|---|
| Carbon | 17.5 | 10.1 |
| Hydrogen | 5.0 | 2.6 |
| Chlorine | 39.4 | 54.7 |
| Oxygen[10] | 16.2 | 10.9 |
| Titanium | 11.9 | 13.0 |
| Magnesium | 7.6 | 7.2 |
| Aluminum | 2.4 | 1.5 |

[10]The amount of oxygen was determined by subtracting total weight of other components from the total weight of the catalyst sample.

The results indicate that treating catalyst A compositions with TiCl$_4$ has some effect on the amount of the elements making up the compositions. The Ti concencrystalline component present.

EXAMPLE IV

Ethylene Polymerization

A 3.8 liter, stirred, stainless steel reactor was employed for ethylene polymerization. The reactor was conditioned for each run by charging to it 3 liters of dry n-heptane, closing the port, and heating the reactor and contents at 175° C. for 30 minutes. The reactor was drained and residual heptane purged with dry nitrogen. The reactor was then closed and cooled under nitrogen pressure.

The conditioned reactor was purged with dry isobutane vapor and 3 ml of the cocatalyst solution containing 15 wt. % triethylaluminum (TEA) in dry n-heptane (2.8 mmoles TEA) was charged followed by addition of the catalyst. The reactor was closed, about 2.1 liters of dry isobutane was charged, the reactor and contents were heated to 80° C. and the ethylene and hydrogen, if used, was added.

Each run was terminated by flashing the ethylene and isobutane and hydrogen, if present, from the reactor. The polymer was then recovered, dried and weighed to obtain the yield.

Each polymer yield was divided by the weight of catalyst employed to determine the calculated catalyst productivity which is expressed as kilograms (kg) polyethylene per gram (g) catalyst per hour. In some runs of less than 60 minutes duration, a productivity figure is calculated for 60 minutes in which the reasonable assumption is made based on past experience that the activity of the catalyst remains unchanged during at least the first 60 minutes of each run. When the catalyst is diluted, a calculated productivity based on kg polyethylene produced per gram diluted catalyst per hour is given as well as kg polyethylne produced per gram catalyst contained in the mixture per hour.

The quantity of each catalyst employed, run time, pressures employed, and results obtained are presented in Table 4.

corresponding "A" catalysts, catalysts A-6 and A-7 (runs 6 and 7).

The best results under the conditions employed, were obtained in run 21 employing catalyst B-10 produced from catalyst A-10 composition prepared from a titanium ethoxide-magnesium chloride reaction product treated with ethyl-aluminum sesquichloride. This catalyst was extremely active and produced 210 kg polyethylene per gram of catalyst per hour.

EXAMPLE V

Catalyst Preparation

Catalyst A

All mixing and filtering operations were performed in a dry box under an argon atmosphere employing a dry hydrocarbon as the reaction medium. Anhydrous magnesium dichloride and titanium tetraethoxide were charged to a flask equipped for refluxing and stirring and containing the chosen reaction medium. Each mixture was heated at the temperature and for the time indicated in Table 5 and cooled to the temperature indicated for the dropwise addition of the 0.783 molar

TABLE 4

ETHYLENE POLYMERIZATION AT 80° C.
2.8 MMoles TEA (3 ml) as Cocatalyst in Each Run

| Run. No. | Catalyst Designation | grams | Run Time min. | Polyethylene Yield grams | Catalyst Productivity kg polymer/g catalyst/hour | | Reaction Pressures | | | | |
|---|---|---|---|---|---|---|---|---|---|---|---|
| | | | | | | | Avg. MPa | Total psig | Ethylene MPa | psig | Hydrogen MPa | psig |
| 1 | A-1 | 0.0146 | 60 | 479 | 32.8 | | 1.79 | 260 | 0.69 | 100 | 0 | 0 |
| 2 | A-2 | 0.0093 | 60 | 330 | 35.5 | | 1.93 | 280 | 0.69 | 100 | 0 | 0 |
| 3 | A-3 | 0.0199 | 60 | 270 | 13.6 | | 1.93 | 280 | 0.69 | 100 | 0 | 0 |
| 4 | A-4 | 0.0210 | 60 | 690 | 32.9 | | 1.93 | 280 | 0.69 | 100 | 0 | 0 |
| 5 | A-5 | 0.0198 | 60 | 504 | 25.5 | | 1.93 | 280 | 0.69 | 100 | 0 | 0 |
| 6 | A-6 | 0.0218 | 60 | 68 | 3.1 | | 1.93 | 280 | 0.69 | 100 | 0 | 0 |
| 7 | A-7 | 0.0134 | 60 | 119 | 8.9 | | 2.00 | 290 | 0.69 | 100 | 0 | 0 |
| 8 | A-8 | 0.0167 | 60 | 480 | 28.7 | | 1.93 | 280 | 0.69 | 100 | 0 | 0 |
| 9 | A-9 | 0.0113 | 60 | 233 | 20.6 | | 1.93 | 280 | 0.69 | 100 | 0 | 0 |
| 10 | A-10 | 0.0054 | 60 | 112 | 20.7 | | 1.93 | 280 | 0.69 | 100 | 0 | 0 |
| 11 | B-1 | 0.0039 | 60 | 577 | 148 | | 1.79 | 260 | 0.69 | 100 | 0 | 0 |
| 12 | B-2[11] | 0.0121 | 60 | 355 | 147 | (29.33 kg/g cat) | 2.00 | 290 | 0.69 | 100 | 0 | 0 |
| 13 | B-3[12] | 0.0116 | 30 | 631 | 109 | (54.4 kg/30 min) | 1.97 | 285 | 0.69 | 100 | 0 | 0 |
| 14 | B-3[13] | 0.0085 | 30 | 510 | 120 | (60.0 kg/30 min) | 1.93 | 280 | 0.69 | 100 | 0 | 0 |
| 15 | B-4[14] | 0.0051 | 40 | 424 | 125 | (83.1 kg/40 min) | 1.97 | 285 | 0.69 | 100 | 0 | 0 |
| 16 | B-5 | 0.0053 | 60 | 387 | 73.0 | | 1.97 | 285 | 0.69 | 100 | 0 | 0 |
| 17 | B-6[15] | 0.0118 | 45 | 787 | 88.9 | (66.7 kg/45 min) | 2.00 | 290 | 0.69 | 100 | 0 | 0 |
| 18 | B-7 | 0.0144 | 60 | 538 | 37.4 | | 2.41 | 350 | 1.0 | 150 | 0.41 | 60 |
| 19 | B-8[16] | 0.0220 | 60 | 162 | 36.4 | (7.34 kg/g cat) | 2.41 | 350 | 1.0 | 150 | 0.41 | 60 |
| 20 | B-9 | 0.0123 | 40 | 688 | 83.8 | (55.9 kg/40 min) | 1.93 | 280 | 0.69 | 100 | 0 | 0 |
| 21 | B-10 | 0.0029 | 60 | 610 | 210 | | 1.97 | 285 | 0.69 | 100 | 0 | 0 |

Notes:
[11] One part by weight catalyst diluted with 4 parts by weight polyethylene powder; calculated productivity is 5 × 29.3 or 147 kg polymer/g undiluted catalyst.
[12] 30 minute run time, calculated productivity is 54.4 × 60 ÷ 30 kg/g cat or 109 kg/g cat/hour.
[13] 30 minute run time, calculated productivity is 60 × 60 ÷ 30 kg/g cat or 120 kg/g cat/hour.
[14] 40 minute run time, calculated productivity is 83.1 × 60 ÷ 40 kg/g cat or 125 kg/g cat/hour.
[15] 45 minute run time, calculated productivity is 66.7 × 60 ÷ 45 kg/g cat or 88.9 kg/g cat/hour.
[16] One weight part catalyst diluted with 3.95 parts by weight polyethylene powder; calculated productivity is 4.95 × 7.36 or 36.4 kg polymer/g undiluted catalyst.
[17] 40 minute run time, calculated productivity is 55.9 × 60 ÷ 40 kg/g cat or 83.8 kg/g cat/hour.

The results given in Table 4 indicate that the A catalysts, while relatively active for ethylene polymerization, are not nearly as active as the B catalysts which are formed from the corresponding A catalysts by a TiCl4 treatment. In terms of kg polyethylene produced per g (undiluted) catalyst per hour, the indicated A catalysts generally produce from about 3 to 36 kg polymer whereas their B counterparts generally produce from about 36 to 210 kg polymer. It is also noted in this regard that catalysts B-6 and B-7 (runs 18 and 19) showed exceptionally high productivities as compared to their solution of ethylaluminum sesquichloride in n-heptane. The resulting slurry was generally stirred an additional 30 minutes after the reaction was completed, stirring was discontinued and the mixture allowed to warm to room temperature, if cooling had been employed. The slurry was suction filtered to produce a filter cake which was washed with portions of dry n-hexane and dried under an argon purge to produce the product.

The quantities of materials employed, weight and mole ratios of reactants charged and results obtained are presented in Table 5.

TABLE 5

| | Preparation of Catalysts (Catalyst A) | | | | | | |
|---|---|---|---|---|---|---|---|
| Catalyst Designation | A-11 | A-12 | A-13 | A-14 | A-15 | A-16[a] | A-17 |
| MgCl$_2$ | | | | | | | |
| grams | 1.90 | 1.90 | 9.52 | 1.92 | 1.92 | 946 | 11.4 |
| mole | 0.020 | 0.020 | 0.100 | 0.020 | 0.020 | 9.94 | 0.120 |
| Ti(OC$_2$H$_5$)$_4$ | | | | | | | |
| grams | 9.12 | 9.11 | 45.40 | 9.39 | 9.10 | 4309 | 55.5 |
| mole | 0.040 | 0.040 | 0.200 | 0.041 | 0.040 | 18.9 | 0.244 |
| Reaction Medium | | | | | | | |
| type | n-hexane | xylenes | xylenes | n-hexane | n-hexane | n-hexane | xylenes |
| ml | 100 | 70 | 250 | 75 | 110 | 60.6 liters | 100 |
| temperature, °C. | 108 | 107 | 110 | 110 | 105 | 84 | 110 |
| heating time, minutes | 30 | 30 | 30 | 30 | 40 | 45 | 60 |
| Ethylaluminum Sesquichloride | | | | | | | |
| ml | 25 | 25 | 125 | 42 | 42 | 12.5 l | 301[b] |
| mole | 0.020 | 0.020 | 0.098 | 0.033 | 0.033 | 12.7 | 0.24 |
| reaction temperature, °C. | 25 | −18 | −20 to −25 | −25 | −27 | 21 to 30 | −23 to −25 |
| reaction time, minutes | 90 | 80 | 270 | 135 | 280 | 120 | 240 |
| Wash liquid | | | | | | | |
| ml | 30 | 30 | 150 | 120 | 120 | 4.57 liter[d] | 300[c] |
| Mole Ratios | | | | | | | |
| Ti/Mg | 2:1 | 2:1 | 2:1 | 2:1 | 2:1 | 1.9:1 | 2:1 |
| Ti/EASC | 2:1 | 2:1 | 2:1 | 1.2:1 | 1.2:1 | 1.5:1 | 1:1 |
| Recovered Product | | | | | | | |
| grams | 5.21 | 4.51 | 20.95 | 6.33 | 6.25 | not recovered | 39.53 |
| color | white | tan | white | tan | tan | not determined | light purple |

[a]Several batches of catalysts were made under the conditions shown which were combined and are identified as A-16.
[b]Add to 200 ml of xylenes cooled to −26° C. and resting in a CCl$_4$/dry ice bath, the solution of MgCl$_2$/Ti(OC$_2$H$_5$) cooled to 25° C. followed by the solution of EASC in a dropwise manner.
[c]Washed filter cake with 50 ml xylenes, then 250 ml of n-hexane.
[d]Used 4, 57 liter portions, decanting liquid off product after each addition.

EXAMPLE VI

Catalyst Preparation

Catalyst B

All mixing and filtering operations were conducted in a dry box under an argon atmosphere employing dry n-hexane as the reaction medium. To a flask equipped for stirring and reflux was charged n-hexane, the catalyst A of Example 5 and titanium tetrachloride. Each mixture was stirred at the temperature and for the time indicated in Table 6, cooled to room temperature, if needed, and then suction filtered. The filter cake was washed with portions of dry n-hexane and dried under an argon purge.

The quantities of components employed, weight ratios of catalyst A to TiCl$_4$ and results obtained are given in Table 6.

EXAMPLE VII

Ethylene Polymerization

A 3.8 liter, stirred, stainless steel reactor as described and conditioned in Example IV was employed for ethylene polymerization.

The conditioned reactor for each run was purged with dry isobutane vapor and 1 ml of the cocatalyst solution containing 15 wt. % triethylaluminum (TEA) in dry n-heptane (0.93 mmoles TEA) was charged followed by addition of the catalyst. The reactor was closed, about 2 liters of dry isobutane was charged, the reactor and contents were heated to 80° C. and the ethylene was added. Hydrogen was not present in any of the runs, thus each of the polymers produced had a negligible melt index. Unless indicated to the contrary in Table 7, a run time of 60 minutes was used in each run.

Each run was terminated and the polymer recovered as described in Example IV. If a run time of less than 60

TABLE 6

| | | | Preparation of Catalyst (Catalyst B) | | | | | | |
|---|---|---|---|---|---|---|---|---|---|
| | | | Weight Ratio | Reaction Condition | | n-Hexane, ml | | | |
| Catalyst | Catalyst A | | TiCl$_4$ | TiCl$_4$/ | Time | Max. | Reaction | | Recovered Product |
| Designation | No. | Grams | Grams | Catalyst A | Min. | Temp. °C. | Medium | Wash | Grams Color |
| B-11 | A-11 | 2.22 | 8.9 | 4:1 | 60 | 112 | 11 | 30[a] | 1.70 lt. purple |
| B-12 | A-12 | 2.05 | 8.0 | 3.9:1 | 60 | 116 | 10 | 30[a] | 1.83 lt. purple |
| B-13-0 | A-13 | 3.00 | 12.0 | 4:1 | 60 | 182 | 15 | 50 | 3.58 yellow |
| B-13-1 | A-13 | 3.00 | 12.0 | 4:1 | 80 | 80 | 15 | 30 | 2.55 white |
| B-13-2 | A-13 | 3.00 | 12.0 | 4:1 | 75 | 132 | 15 | 30 | 2.71 lt. yellow |
| B-13-3 | A-13 | 2.00 | 7.7 | 3.85:1 | 60 | 25 | 10 | 30[a] | 1.61 white |
| B-14 | A-14 | 2.19 | 7.7 | 3.5:1 | 60 | 122 | 15 | 30 | 2.10 brown |
| B-15 | A-15 | 2.03 | 7.7 | 3.8:1 | 60 | 105 | 10 | 30[a] | 1.99 lt. purple |
| B-16 | A-16 | 5255[a] | 9072 | 1.7:1 | 60 | 25 | 18.9 l. | 4, 57 l. portions | 2470[a] brown |
| B-17 | A-17 | 39.53 | 154.0 | 3.9:1 | 55 | 110 | 200 | 200 | 33.36 lt. purple |
| B-18 | A-11 | 0.79 | 3.4 | 4.3:1 | 60 | 25 | 5 | 30[a] | 0.69 grayish |

Note:
[a]Estimated minutes was employed, a calculated productivity figure for 60 minutes is employed as described in Example 4.

The particle size distribution of the recovered polymer as made and/or ground in a Wiring Blendor was determined by placing about 100 grams of the polymer on a set of mechanically agitated sieves. The sieve set consisted of sieves having the mesh sizes (U.S. Sieve Series) of 30, 50, 80, 100, 200 and the bottom pan. Agitation was conducted for 30 minutes unless indicated otherwise and the amount of polymer remaining on each sieve and in the pan was determined by weighing. The ground samples were agitated for 2 minutes at high speed at room temperature in a Waring Blendor. The purpose of grinding the as made polymer is to simulate the attrition polymer particles appear to receive in a large scale reactor such as a loop reactor, for example, since commercially formed polymer particles are generally subjected to substantial agitation which results in the production of finer particles as compared to those made on the bench scale.

Grinding the polymer in a Waring Blendor as referred to above and throughout this application is carried out by grinding 100 grams of the polymer fluff in a dry condition at room temperature (25° C.) for 2 minutes using the highest speed on a Waring Blendor Model 31DL42 manufactured by Waring Products Division, Dynamics Corporation of America, New Hartford, Conn. Although most any grinder or blender suitable for vigorously agitating relatively small quantities of polymer can be used, the Waring Blendor described above worked very well.

The ground fluff is then screened for 15 minutes. An electric Ro-Tap Sieve Shaker manufactured by the U.S. Tyler Manufacturing Company, Cleveland, Ohio, was used; however, most any sieve shaker could be used or the polymer could be sieved by hand.

The quantity of each catalyst employed and results obtained are given in Table 7.

In each run the ethylene partial pressure was 0.69 MPa (98.5 psig), and the average total pressure was 1.9 MPa (271.4 psig) for all runs except runs 24 and 26 in which it was 2.0 MPa (285.7 psig).

hour as well as from a particle size distribution of the polymer. The catalysts of runs 22-24 form relatively coarse polymer as made consisting approximately of 80 wt. % coarser than 100 mesh. The polymer is somewhat friable in nature, however, since after grinding it in a Waring Blendor for 2 minutes the amount of coarse polymer remaining consists of about 45 to 60 wt. % coarser than 100 mesh.

When catalyst A is made in an aromatic reaction medium at about −20° to −25° C. and catalyst B is formed by contact of catalyst A with TiCl$_4$ at temperatures ranging from about 80° to 180° C. the particle size of as made polymer and ground polymer is coarser in nature as the results of runs 25-29 demonstrate. The coarsest, most attrition resistant polymer in this example was made with catalyst B formed by contact with TiCl$_4$ at 180° C. However, the productivity of this catalyst was substantially lower as compared to the other catalysts of runs 25-29. The data in runs 25-29 indicate that when catalyst A is formed at about −25° C. and catalyst B is formed from catalyst A at about 80° to about 130° C. said catalyst B is capable of producing coarser, more attrition resistant polymer than those from runs 22 to 24 at high rates in a slurry polymerization process.

All of the polymers shown in Table 7 have relatively low melt index values, as determined in accordance with the procedure of ASTM D1238-65T, condition E.

EXAMPLE VIII

Ethylene Polymerization—Effect of Cocatalyst Level

A 3.8 liter, stirred, stainless steel reactor as described and conditioned in Example IV was employed for ethylene polymerization.

The conditioned reactor for each run was purged with dry isobutane, the indicated quantity of cocatalyst solution containing 15 wt. % triethylaluminum (TEA) in dry n-heptane (1 molar) was charged followed by addition of the catalyst. A portion of catalyst B-16 was used in each run. The reactor was closed, about 2 liters of dry isobutane was charged, the reactor and contents were heated to 100° C. and the ethylene and hydrogen

TABLE 7

Effect of Catalyst Formation Conditions on Polymer Particle Size and Productivity

| | Catalyst Formation | | | Catalyst | | Calculated | Polymer | | |
| | | | | | | | | Wt. % Coarser Than 100 Mesh | |
| Run No. | Reaction Medium | EASC °C. | TiCl$_4$ °C. | Weight Grams | No. | Productivity Kg/g/hr$^{(a)}$ | Yield Grams | As Made | Ground |
|---|---|---|---|---|---|---|---|---|---|
| 22 | n-hexane | 25 | 112 | 0.0023 | B-11 | 193.5 | 445 | 82 | 59 |
| 23 | n-hexane | −25 | 122 | 0.0050 | B-14 | 107.8 | 539 | 81$^{(d)}$ | 54$^{(d)}$ |
| 24 | n-hexane | −25 | 105 | 0.0034 | B-15 | 248.5$^{(b)}$ | 507 | —$^{(e)}$ | 46$^{(d)}$ |
| 25 | xylenes$^{(f)}$ | −24 | 25 | 0.0036 | B-13-3 | 161.7 | 582 | 95 | 82 |
| 26 | xylenes | −24 | 80 | 0.0068 | B-13-1 | 97.5 | 663 | 93 | — |
| 27 | xylenes | −18 | 116 | 0.0053 | B-12 | 162.1$^{(c)}$ | 573 | 91 | 85 |
| 28 | xylenes | −24 | 132 | 0.0067 | B-13-2 | 82.7 | 554 | 96 | 89 |
| 29 | xylenes | −25 | 180 | 0.0099 | B-13-0 | 19.8 | 196 | 99.8 | 95 |
| 30 | n-hexane | 25 | 25 | 0.0045 | B-18 | 144 | 647 | —$^{(e)}$ | 34 |

$^{(a)}$kg polymer per g catalyst per hour.
$^{(b)}$Run time of 36 minutes giving 507 g polymer. Productivity for 60 minutes is calculated to be 149.1 kg/g/36 min. × 60 min. + 36 min. or 248.5 kg/g/60 min.
$^{(c)}$Run time of 40 minutes giving 573 g polymer. Productivity for 60 minutes is calculated to be 108.1 kg/g/40 min. × 60 min. + 40 min. or 162.1 kg/g/60 min.
$^{(d)}$Sieve agitation for 15 minutes was employed.
$^{(e)}$A dash signifies no determination was made.
$^{(f)}$Analytical reagent quality, 137°-144° C. boiling point range.

Inspection of the results presented in Table 7 shows that the reaction conditions employed in forming the catalyst are of importance from a productivity standpoint of polymer produced per unit catalyst weight per were charged. Run times of 60 minutes were employed.

Each run was terminated and the polymer recovered as described in Example IV. The particle size distribution of the as made and/or ground polymer was determined as described in Example 7.

The quantity of each catalyst and cocatalyst employed, the melt index of each polymer and the results obtained are given in Table 8.

In each run, the initial hydrogen pressure was 0.34 MPa (50 psig), the ethylene partial pressure was 1.4 MPa (200 psig) and the total pressure attained during polymerization was 3.4 MPa (500 psig) except for run 35 which it was 3.3 MPa (485 psig).

Melt index determinations of the produced polymer clearly show that commercially useful material was produced since many applications exist for polymers in the 0.4 to 4 melt index range including film, sheet, pipe, bottles, containers, and the like. The HLMI/MI ratios shown are indicative of relatively narrow molecular weight distribution polymer. Ethylene polymers with such molecular weight distribution are especially suitable for injection molding.

TABLE 8

Effect of Cocatalyst Concentration on Polymer Particle Size

| Run No. | Catalyst Wt. g | mmoles | g | ppm[a] | Wt. ratio Cocat./ Catalyst | Calculated Productivity kg/g/hr | Polymer Yield g | MI[b] | HLMI[c] MI | Weight Percent Coarser Than 100 Mesh As Made | Ground |
|---|---|---|---|---|---|---|---|---|---|---|---|
| 31 | 0.0059 | 0.2 | 0.023 | 21 | 3.9 | 51.4 | 303 | 1.1 | 29 | —[e] | 66 |
| 32 | 0.0051 | 0.25 | 0.029 | 26 | 5.7 | 24.7 | 126 | 0.4 | 31 | 99 | 45 |
| 33 | 0.0052 | 0.3 | 0.035 | 31 | 6.7 | 63.5 | 330 | 0.6 | 31 | — | 87 |
| 34 | 0.0057 | 0.5 | 0.058 | 52 | 10 | 44.6 | 254 | 1.7 | 25 | — | 66 |
| 35 | 0.0099 | 0.5 | 0.058 | 52 | 5.9 | 39.7 | 393 | 1.6 | 27 | 99 | 88 |
| 36 | 0.0068 | 1.0 | 0.115 | 104 | 17 | 38.6 | 249 | 4.0 | 28 | 99 | 73 |
| 37 | 0.0071 | 2.0 | 0.230 | 208 | 32 | 38.7 | 275 | 2.1 | 29 | — | 84 |
| 38 | 0.0072 | 5.0 | 0.576 | 520 | 80 | 34.2 | 246 | 1.3 | 28 | 99 | 95 |

[a]Parts per million based on the weight of 2 liters of isobutane (1100 g).
[b]MI is melt index, g/10 minutes, ASTM D1238-65T, condition E.
[c]HLMI is high load melt index, g/10 minutes, ASTM D1238-65T, condition F. The ratio, HLMI/MI, is believed to relate to molecular weight distribution. The higher the value, the broader the distribution.
[d]The levels of TEA cocatalyst employed in the runs can be related to an approximate mole ratio of TEA to Ti in the above catalysts ranging from about 10:1 to about 450:1.
[e]A dash signifies no determination was made.

The data given in Table 8 show that the coarse polymer as made is produced at all of the cocatalyst levels employed. The trends observed in runs 31–38 indicates that more attrition resistant polymer is formed as the cocatalyst level increases based on the ground polymer results. At the same time, however, the productivity of the catalyst appears to diminish somewhat as the cocatalyst level increases. Since aluminum alkyl cocatalysts are relatively expensive materials it is desirable to use the least amount of cocatalyst consistent with high polymer production and low cocatalyst residues as well as the production of attrition resistant polymer. The results indicate that the objective is reached with the materials and conditions employed when the cocatalyst level ranges between about 20 to 200 ppm TEA (wt. ratio of cocatalyst to catalyst of about 4:1 to about 40:1), more preferably between about 30 to 100 ppm (wt. ratio of cocatalyst to catalyst of about 6:1 to about 35:1).

EXAMPLE IX

A. Catalyst Preparation (Catalyst A)
B. Catalyst Preparation (Catalyst B)
C. Ethylene Polymerization in Presence of Hydrogen A. A series of Catalyst A was prepared generally in the manner indicated previously as in Example V. The quantities of reactants employed, reaction conditions used, and results obtained are given in Table 9. B. Catalyst B was prepared generally in the manner described in Example VI by contacting a weighed portion of the Catalyst A series with TiCl$_4$. The quantities of reactants employed, reaction conditions utilized, and results obtained are shown in Table 9B. A series of ethylene polymerization runs were carried out generally as described in Example VII using each catalyst B shown in Table 9B; however each polymerization run was carried out in the presence of hydrogen in order to produce a higher melt index polymer. The polymers produced and the conditions employed are shown in Table 9C.

TABLE 9A

| | Preparation of Catalysts (Catalyst A) | | | |
|---|---|---|---|---|
| Catalyst Designation | A-19 | A-20 | A-21 | A-22 |
| MgCl$_2$ | | | | |
| grams | 1.90 | 9.52 | 11.40 | 5.80 |
| mole | 0.020 | 0.100 | 0.120 | 0.061 |
| Ti(OC$_2$H$_5$)$_4$ | | | | |
| grams | 9.10 | 45.40 | 56.19 | 28.23 |
| mole | 0.040 | 0.200 | 0.246 | 0.124 |
| Reaction Medium | | | | |
| type | n-hexane | xylenes | xylenes | xylenes |
| ml | 100 | 250 | 300 | 150 |
| temp., °C. | 97 | 110 | 120 | 120 |
| heating time, min. | 30 | 30 | 40 | 35 |
| Ethylaluminum Sesquichloride | | | | |
| ml | 25 | 125 | 220 | 77.5 |
| mole | 0.020 | 0.098 | 0.170 | 0.060 |
| reaction temp., °C. | +25 | −20 to −25 | −25 to −35 | −21 to −27 |
| reaction time, min. | 95 | 270 | 8.6 hours | 205 |
| Wash Liquid | n-hexane | n-hexane | n-hexane | n-hexane |
| ml | 100 | 100 | 400 | 1000 (4-250 ml portions) |

TABLE 9A-continued

| | Preparation of Catalysts (Catalyst A) | | | |
|---|---|---|---|---|
| Catalyst Designation | A-19 | A-20 | A-21 | A-22 |
| Mole Ratios | | | | |
| Ti/Mg | 2:1 | 2:1 | 2:1 | 2:1 |
| Ti/EASC | 2:1 | 2:1 | 1.4:1 | 2:1 |
| Recovered Product | | | | |
| grams | 2.10 | 2.55 | not determined | not determined |
| color | brown | white | brown | brown |

TABLE 9B

Preparation of Catalysts (Catalyst B)

| Catalyst Desig. | Catalyst A No. | Catalyst A Grams | TiCl₄ Grams | Wt. Ratio TiCl₄/Cat. A | Reaction Conditions Time Min. | Reaction Conditions Max. Temp. °C. | n-Hexane, ml Reaction Medium | n-Hexane, ml Wash Medium | Recovered Product Grams | Recovered Product Color |
|---|---|---|---|---|---|---|---|---|---|---|
| B-19 | A-19 | 5.05 | 10.4 | 2.1:1 | 60 | 25 | 25 | 30 | 4.71 | brown |
| B-20 | A-20 | 3.00 | 12. | 4:1 | 60 | 80 | 15 | " | 2.55 | white |
| B-21 | A-21 | 31.9$^{(a)}$ | 128 | 4:1 est. | 60 | 122 | 150 | 400 est. | 32.55 | lt. purple |
| B-22 | A-12 | 2.11 | 7.9 | 3.7:1 | 60 | 25 | 10 | 45 | 1.90 | gray |

$^{(a)}$Estimated yield based on previous experiments.

TABLE 9C

Ethylene Polymerization, Hydrogen Present, 1 Mmole TEA
Effect of catalyst Formation on Productivity and Polymer Particle Size

| Run No. | Catalyst Formation Reaction Medium | Catalyst Formation EASC °C. | Catalyst Formation TiCl₄ °C. | Catalyst No. | Catalyst Weight Grams | Pressures, MPa$^{(c)}$ Ethylene | Pressures, MPa$^{(c)}$ Hydrogen | Pressures, MPa$^{(c)}$ Total Reactor | Calculated Productivity kg/g/hr | Polymer Yield Grams | Polymer Melt Index | Polymer Wt. % Coarser Than 100 Mesh (Ground) |
|---|---|---|---|---|---|---|---|---|---|---|---|---|
| 39 | n-hexane | 25 | 25 | B-19 | 0.0212 | 1.48 | 0.446 | 3.41 | 21.7 | 461 | 3.6 | 57 |
| 40 | " | " | " | " | 0.0183 | " | 0.892 | 3.62 | 8.42$^{(a)}$ | 154$^{(a)}$ | 4.7 | 33 |
| 41 | " | " | " | " | 0.0195 | " | " | " | 26.6$^{(b)}$ | 518$^{(b)}$ | 13 | 58 |
| 42 | " | " | " | " | 0.0156 | " | " | 3.55 | 12.4 | 194 | 19 | 48 |
| 43 | xylenes | −18 | 25 | B-22 | 0.0061 | " | " | " | 48.5 | 296 | 12 | 57 |
| 44 | " | −25 to −35 | 122 | B-21 | 0.0077 | " | 0.446 | 3.62 | 45.7 | 352 | 0.17 | 92.5 |
| 45 | " | −25 to −35 | " | " | 0.0117 | " | 0.892 | 3.76 | 36.4 | 426 | 3.2 | 67 |
| 46 | " | −25 to −35 | " | " | 0.0133 | 1.20 | 1.14 | 3.69 | 34.7 | 461 | 11 | 63 |
| 47 | " | −20 to −25 | 80 | B-20 | 0.0119 | 1.48 | 0.892 | 3.55 | 15.1 | 180 | 13 | 65 |

$^{(a)}$Run time is 2¼ hours, productivity of kg/g/2¼ hours.
$^{(b)}$Run time is 2 hours, productivity of kg/g/2 hours.
$^{(c)}$Absolute pressures.

The effects of a low mixing temperature and a high treating temperature on the modified catalysts of the invention with respect to polymer particle size and attrition resistance are demonstrated in the results of the runs shown in Table 7 in which a low melt index polymer was produced and in invention runs 44–47 of Table 9C in which a relatively high melt index polymer was produced. It has been observed from past experience that grinding tests made on polymer formed with the catalysts of the present invention result in less coarse polymer (more fines) when the polymer melt index is above about 1. Also, a leveling effect appears to take place when the melt index ranges from about 5 to at least about 40. The amount of coarse polymer after grinding generally amounts from about 80 to about 95 wt. % for low melt index polymer and from about 60 to about 70 wt. % for high melt index polymer. Therefore, it is currently believed that a catalyst can be more accurately evaluated for potential commercial use (in absence of a commercial run) by preparing relatively high melt index polymer (about 5 to 40 melt index) as compared to a low melt index polymer on a bench scale.

EXAMPLE X

A. Catalyst Preparation (Catalyst A and Catalyst B)
B. Polymerization in Presence of Hydrogen A. As before all mixing and filtering operations were conducted in a dry box (in the essential absence of air, i.e., oxygen, and water) under a dry Argon atmosphere unless indicated otherwise.

A bottle was charged with 1.90 g (0.020 mole) of MgCl₂ and slurried in 50 ml of m-xylene and 13.66 g (0.040 mole) of titanium tetra-n-butoxide (abbreviated Ti(OBu)₄). The bottle was capped, and the slurry was heated for 1 hour beginning at 67° C. and ending at 120° C. to produce a solution containing a small amount of undissolved material. The solution was cooled to about 25° C. and to it was then added dropwise over a 43 minute period to 30 ml (0.0234 mole) of 0.783 M EASC contained in n-heptane. The dark-colored slurry was stirred an additional 45 minutes at room temperature (about 25° C.) then the contents were suction filtered to give a dark yellow filtrate and a light brown filter cake. The filter cake was washed with 100 ml of n-hexane and dried under an Argon stream to yield 4.83 g of a light brown powder as catalyst A-23.

A bottle was charged with 2.0 g of catalyst A-23 and slurried in 10 ml of n-hexane. The bottle was capped and into it was injected 2.2 ml (3.8 g) of $TiCl_4$. The slurry was stirred for 1 hour at 91°–103° C., then the contents were suction filtered to give a red-yellow filtrate and a brown filter cake. The cake was washed with 50 ml of n-hexane and dried under an Argon stream to yield 1.85 g of a brown powder as catalyst B-23.

A bottle was charged with 7.60 g (0.0798 mole) of $MgCl_2$ and slurried in 20 ml of m-xylene and 27.10 g (0.0796 mole) of $Ti(OBu)_4$. The slurry was refluxed for 35 minutes and 40 ml of m-xylene added to it. After refluxing an additional 45 minutes, 100 ml of m-xylene was charged to the mixture. The resulting opaque, orange solution was cooled to room temperature, transferred to a capped vessel and treated dropwise over a 45 minute period with 100 ml (0.0783 mole) of the 0.783 M EASC solution. The resulting slurry was stirred for 30 minutes and then suction filtered yielding a dark red filtrate and a brown filter cake. The cake was washed with 100 ml of n-hexane and dried under an Argon stream to yield 15.11 g of light brown powder as catalyst A-24.

A bottle was charged with 2.0 g of catalyst A-24 and slurried in 20 ml of n-hexane. The bottle was capped and to it was injected 4.7 ml (8 g) of $TiCl_4$. The slurry was heated for 1 hour at a temperature beginning with 48° C. and ending with 104° C. The slurry was then cooled to about 25° C. and suction filtered to yield a brown filter cake. The cake was washed with 50 ml of n-hexane and dried under an Argon stream to yield 1.83 g of a yellow-brown powder as catalyst B-24.

A bottle was charged with 3.81 g (0.0400 mole) of $MgCl_2$ and slurried in 10 ml of m-xylene and 7.16 g (0.0210 mole) of $Ti(OBu)_4$. The slurry was heated for 40 minutes at from 120°–142° C. The almost clear solution was mixed with 100 ml of m-xylene and cooled to about 25° C. The solution was treated dropwise over 35 minutes with 25 ml (0.0196 mole) of the 0.783 M EASC solution. The resulting slurry was stirred for 25 minutes at about 25° C. and suction filtered to give a red filtrate and a dark-colored filter cake. The cake was washed with 110 mL of n-hexane and dried under an Argon stream to yield 6.54 g of a light purple powder as catalyst A-25.

A bottle was charged with 2.0 g of catalyst A-25 and slurried in 22 ml of n-hexane. The bottle was capped and into it was injected 4.7 ml (8 g) of $TiCl_4$. The bottle and contents were then heated 1 hour at 102°–105° C., cooled to about 25° C. and the contents suction filtered to produce an orange filtrate and a gray filter cake. The cake was washed with 50 ml of n-hexane and dried under an Argon stream to yield 1.87 g of a grayish powder as catalyst B-25.

A bottle was charged with 7.61 g (0.0799 mole) of $MgCl_2$ and slurried in 20 ml of m-xylene and 7.55 g (0.0222 mole) of $Ti(OBu)_4$. The slurry was stirred for 20 minutes at 141° C. and cooled to about 25° C. The resulting solid mass was taken up in 120 ml of m-xylene, forming a viscous, opaque syrup. After stirring the syrup for 30 minutes at 25° C., it was mixed with an additional 50 ml of m-xylene. The resulting still syrupy opaque solution was treated over a 11 minute period with 25 ml (0.0196 mole) of the 0.783 M EASC solution. The resulting slurry was stirred 26 minutes at about 25° C. and suction filtered to give a light yellow filtrate and a gray filter cake. The cake was washed with 100 ml of n-hexane and dried under an Argon stream to afford 11.13 g of a gray powder as catalyst A-26.

A slurry formed from 2.34 g of catalyst A-26 and 15 ml (25.7 g) of $TiCl_4$ was heated for 51 minutes at 100°–102° C. then cooled to about 25° C. and suction filtered to give a red filtrate and a light yellow filter cake. The cake was washed with 50 ml of n-hexane and dried under an Argon stream to yield 2.18 g of yellow powder as catalyst B-26.

A bottle was charged with 1.90 g (0.020 mole) of $MgCl_2$, 4.83 g (0.010 mole) of a commercially available cresyl titanate which was analyzed and found to have a 2:1 molar ratio of butyl to cresyl groups (cresyls being an orthopara mixture), and 20 ml of Soltrol® 130, a mixture of odorless mineral spirits having a boiling range of 176°–207° C. available from Phillips Petroleum Company, Bartlesville, OK. The slurry was diluted with 20 ml of m-xylene and heated for 15 minutes at 125° C. At that time the resulting slurry was admixed with another 20 ml of m-xylene. After another 15 minutes at 125° C. still another 20 ml of m-xylene was added to the slurry resulting in the formation of a thick syrup. After heating an additional 55 minutes at 125° C., 70 ml of m-xylene were added and the mixture again heated at 125° C. for 20 minutes resulting in the formation of a dark red solution. The solution was cooled to about 25° C. and treating with 13 ml (0.0102 mole) of the 0.783 M EASC solution over a 5 minute period. The resulting dark colored slurry was stirred at about 25° C. for 1¼ hours and then suction filtered to yield a dark red filtrate and an orange filter cake. The cake was washed with 100 ml of n-hexane and dried under an Argon stream to yield 3.07 g of an orange powder as catalyst A-27.

A slurry formed from the catalyst A-27 powder, 35 ml of n-hexane and 7.5 ml (12.8 g) of $TiCl_4$ was stirred for 1 hour at 105° C. The slurry was cooled to about 25° C. and suction filtered to give a bright red filtrate and an orange-red filter cake. The cake was washed with 50 ml of n-hexane and dried under an Argon stream to yield 2.61 g of an orange-red powder as catalyst B-27.

A bottle was charged with 1.33 g (0.00976 mole) of $ZnCl_2$, 30 ml of n-hexane, 4.55 g (0.020 mole) of $Ti(OEt)_4$ and 20 ml of dry tetrahydrofuran (THF). The bottle and contents were heated to about 80° C. resulting in a two phase solution-slurry mixture. At that point, an additional 10 ml of THF was added which produced a solution. The solution was heated 10 more minutes at 80° C. then it was cooled to about 55° C. and treated over a 12 minute period with 33 ml (0.020 mole) of 0.6 M dibutylmagnesium dissolved in a n-heptane/n-hexane mixture. The resulting slurry was stirred for 48 minutes at about 55° C., cooled to about 25° C. and suction filtered to give a black filtrate and a dark green filter cake. The cake was washed with 100 ml of n-hexane and dried under an Argon stream to yield 5.52 g of a green powder as catalyst A-28.

A slurry formed from 2.0 g of catalyst A-28, 20 ml of n-hexane and 4 ml (6.9 g) of $TiCl_4$ was stirred for 1 hour at about 25° C. The resulting product was suction filtered to give a yellow filtrate and a brown filter cake. The cake was washed with 50 ml of n-hexane and dried under an Argon stream to yield 2.49 g of a light tan powder as catalyst B-28.

Before starting catalyst preparation using $MgBr_2$ it was necessary to dehydrate the commercially available $MgBr_2.6H_2O$ salt. A 500 ml flask was charged with 30 g of the hydrated salt and about 350–400 ml of absolute ethanol. The water was partly removed and the ethanol largely removed as the ethanol-water azeotrope by fractional distillation after which about 45 ml of n-heptane was added to the flask and the remaining portion of the water removed as the ternary water-ethanol-n-heptane azeotrope and the excess ethanol as the ethanol-n-heptane azeotrope. Distillation was stopped, the clear n-heptane removed by decanting and the remaining n-heptane removed under reduced pressure leaving behind a white solid as dehydrated $MgBr_2$. Actually the solid is an $MgBr_2$ alcoholate which was formed in the process.

A bottle was charged with 2.30 g (0.012 mole) of the $MgBr_2$ alcoholate and slurried with 40 ml of dry THF and 5.40 g (0.024 mole) of $Ti(OEt)_4$. The slurry was heated at 110° C. for 5 minutes producing a solution. The solution was then cooled to about 25° C. and treated over a 15 minute period with 40 ml (0.024 mole) of the 0.6 M dibutylmagnesium solution. The bottle with the slurry was heated to 60° C. and treated over a 13 minute period with another 40 ml of the 0.6 M dibutylmagnesium solution. The resulting slurry product was stirred 40 minutes more at 60° C., cooled to about 25° C., and suction filtered to give a dark colored filtrate and a black filter cake. The cake was washed with 100 ml of n-hexane and dried under an Argon stream to afford 5.05 g of a black powder as catalyst A-29.

A slurry formed from 2.0 g of catalyst A-29, 20 ml of n-hexane and 4 ml (6.9 g) of $TiCl_4$ was stirred for 1 hour at about 25° C. The slurry was then suction filtered to yield a pale yellow filtrate and a black filter cake. The cake was washed with 100 ml of n-hexane and dried under an Argon stream to yield 2.36 g of a black powder as catalyst B-29.

In order to demonstrate the reaction of alkyl zirconates with magnesium chloride the following experiment was performed. The catalytic activity of any precipitates was not pursued as the main purpose of the experiment was to demonstrate the occurrence of the above reaction between alkyl zirconates and magnesium chloride.

A bottle was charged with 1.53 g (0.016 mole) of $MgCl_2$, 14 ml (0.032 mole) of zirconium tetra-n-propoxide.2 n-propanol, and 90 ml of n-heptane. The bottle under a nitrogen purge was heated to reflux temperature and refluxed for 30 minutes producing a yellow solution containing a very small amount of an oil thought to be an impurity. The solution was cooled to about 25° C. and 30 ml of n-heptane were added as a precipitate was forming. A total solution resulted.

B-I. Ethylene polymerization

The polymerization runs were conducted for 1 hour at 100° C. with an ethylene partial pressure of 1.38 MPa, a variable hydrogen charge near 0.3–0.7 mole in order to give the desired polymer melt index, and with 2 ml of 1 M TEA as a n-heptane solution as the cocatalyst.

The reactor was a 3.8 liter, stirred reactor, which was conditioned for each run by washing the interior with dry n-heptane under a nitrogen atmosphere at 150° C. After draining the heptane and purging with isobutane vapor and with the temperature of the interior about 25° C., the reactor was charged with the cocatalyst and then with the catalyst (weighed portions of 10–20 mg). The reactor port was closed, 2 liters of isobutane were added, the reactor temperature was raised to 100° C., the hydrogen was added and then the ethylene was charged.

The runs were terminated by venting the gases, cooling the reactor, and the polymer recovered, dried and weighed to determine the yields. Melt index values of the polymer samples are determined in accordance with ASTM D 1238-65T, Condition E.

The results are presented in Table 10A.

B-II. Ethylene/1-Butene-Polymerization

The polymerization runs were conducted for 1 hour at 90° C. with an ethylene/1-butene partial pressure of 0.69 MPa and a hydrogen charge of 0.17 mole and a total reactor pressure of 2.38 MPa. 1 ml of 1 M TEA was used as cocatalyst in each run. After the reaction was charged with isobutane, 49 g of 1-butene were pumped into the reactor. The remaining components were then charged in the same order and the polymer isolated in the same manner described for ethylene polymerization. Melt index values are determined in accordance with ASTM D 1238-65T, Condition E. Density values are determined in accordance with ASTM D 1505-68.

The results are given in Table 10B.

TABLE 10A

Ethylene Polymerization

| Run No. | Catalyst No. | Ti(OR)$_4$ R | Mole Ratio Ti(OR)$_4$:MgCl$_2$ | Productivity kg/g/hour[a] | Polymer Melt Index |
|---|---|---|---|---|---|
| 48 | B-24 | n-butyl | 1:1 | 41.8 | 1.4 |
| 49 | " | " | " | 33.6 | 1.0 |
| 50 | B-25 | " | 1:2 | 85.3 | 0.13 |
| 51 | " | " | " | 80.5 | 0.60 |
| 52 | B-26 | " | 1:4 | 123.0 | 0.17 |
| 53 | " | " | " | 97.0 | 0.07 |
| 54 | B-27 | n-butyl/cresyl | 1:2 | 174.0 | low[b] |
| 55 | " | n-butyl/cresyl | " | 166.0 | 0.08 |
| 56 | " | n-butyl/cresyl | " | 172.0 | 0.05 |
| 57 | " | n-butyl/cresyl | " | 154.0 | 1.0 |

Notes:
[a]kilograms polymer per g catalyst per hour
[b]too low to measure

TABLE 10B

Ethylene/1-Butene Copolymerization

| Run No. | Catalyst No. | Ti(OR)$_4$ R | Ti(OR)$_4$:NX$_2$ MX$_2$ | Mole Ratio | Productivity kg/g/hour[a] | Polymer MI | Density g/mL |
|---|---|---|---|---|---|---|---|
| 58 | B-23 | n-butyl | MgCl$_2$ | 2:1 | 46.5 | 4.1 | 0.9352 |
| 59 | B-28 | ethyl | ZnCl$_2$ | " | 26.2 | 1.8 | 0.9414 |
| 60 | B-29 | " | MgBr$_2$ | " | 5.10 | 1.4 | 0.9391 |

Notes:
[a]kilogram polymer per g catalyst per hour

The results given in Example 10 and in Tables 10A, 10B demonstrated that active ethylene homo- and copolymerization catalysts are made according to the teachings of this invention.

The results given in Tables 10A, 10B, based on the catalysts prepared as described in Example 10, demonstrate that active catalysts for ethylene homopolymerization and ethylene/1-olefin copolymerization results by following the teaching of this invention. The catalysts are derived by contacting a solution of the specified titanium tetrahydrocarbyloxide metal dihalide composition with the specified organometal compound as a precipitating agent and treating the resulting precipitated composition with $TiCl_4$ to form the most active form of the invention catalysts (catalyst B). In some instances, depending upon the nature of the metal halide and the initial composition comprising the metal halide and the titanium compound, it is necessary to use a polar solvent or a mixture of a polar and nonpolar solvent. It is believed that the selection of the solvent to employ is well known to those skilled in this art or can be readily determined by them.

EXAMPLE XI

Catalyst Preparation

As before all mixing and filtering operations were conducted in a dry box under a nitrogen atmosphere employing dry n-heptane as the reaction medium. Anhydrous magnesium dichloride ($MgCl_2$) and titanium tetraethoxide [abbreviated $Ti(OEt)_4$] were charged to a vessel equipped for stirring and refluxing.

To a vessel was charged 3.88 g (0.041 mole) of $MgCl_2$, 18.20 g of 85% pure $Ti(OEt)_4$ (equivalent to 0.0679 mole of 100% alkoxide) and 200 ml of n-heptane. The vessel was capped and removed from the box and heated while stirring for 35 minutes at about 96° C. to obtain a solution. The solution was cooled to about room temperature (25° C.) and while stirring, 7.55 ml (0.079 mole) of $VOCl_3$ as a precipitating agent was charged by syringe to the vessel in less than about 3 minutes resulting in the formation of a voluminous, white precipitate. The slurry was stirred an additional 30 minutes. The vessel was returned to the dry box, its contents were suction filtered and the cake washed with 50 ml of dry n-hexane (in small portions), then dried under an argon stream to afford 10.0 g of a white powder. (Catalyst A-30).

While in the dry box a vessel was charged with 2.0 g of the white powder and slurried with 10 ml of n-hexane. The vessel was capped, removed from the box, injected with 2.2 ml (3.8 g, 0.020 mole) of $TiCl_4$, and heated for 40 minutes at about 100° C. with stirring. Stirring and heating were discontinued and the vessel and contents cooled to room temperature and returned to the dry box. The contents were suction filtered, the filter cake washed with 50 ml of dry n-hexane, and dried under an argon stream to yield 1.28 g of a white powder as the catalyst. (Catalyst B-30).

The catalyst was analyzed and found to contain 13.96 wt. % Ti, 11.4 wt. % Mg, 0.11 wt. % V, 39.5 wt. % Cl, 15.81 wt. % C, 4.56 wt. % H and by difference, 14.66 wt. % O.

To a vessel was charged 2.856 g (0.0300 mole) of $MgCl_2$, 13.673 g (0.0600 mole) of $Ti(OEt)_4$ and 150 ml of n-heptane. The vessel was removed from the box and while under a dry nitrogen purge it was refluxed, while stirring, for about 1 hour. The vessel and contents were cooled to room temperature, returned to the dry box and suction filtered. The filter was rinsed with 10 ml of n-heptane. A portion of the filtrate, 49.5 ml was charged to a vessel which was capped and removed from box and charged by syringe with 2.2 ml (0.020 mole) of $TiCl_4$, at room temperature. The mixture was stirred while at room temperature for about 4 hours. The vessel was then returned to the dry box where its contents were suction filtered. The filter cake was washed with 50 ml of dry n-hexane and dried under a nitrogen stream to afford 6.170 g of a white powder. (Catalyst A-31). This catalyst was not subsequently treated with $TiCl_4$ to produce a corresponding Catalyst B-31 composition.

To a vessel was charged 3.80 g (0.0399 mole) of $MgCl_2$, 18.20 g of 85 wt. % $Ti(OEt)_4$ in n-hexane (equivalent to 0.0679 mole alkoxide) and 100 ml of m-xylene. The vessel was capped, removed from the dry box and heated with stirring at 105° C. for 30 minutes to obtain a solution. The solution was cooled to about 25° C. and treated dropwise with 10 ml (0.0872 mole) of $SiCl_4$ diluted in 30 ml of m-xylene over a 30-minute period, using a needle valve to introduce the solution. The vessel containing a lemon-colored slurry was transferred to the dry box where the slurry was suction filtered. The white filter cake was washed with 100 ml of dry n-hexane and dried under an argon stream to yield 5.44 g of a white powder. (Catalyst A-32).

While in the dry box, 2.00 g of the white catalyst A-32 above was charged to a vessel, slurried with 10 ml n-hexane, the vessel capped and removed from the box. The vessel was then injected with 2.2 ml (3.8 g, 0.020 mole) of $TiCl_4$ and heated for about 40 minutes at 95° C. with stirring. Stirring and heating were discontinued, the vessel and contents cooled to room temperature and returned to the dry box. The contents were suction filtered, the filter cake washed with 50 ml of dry n-hexane and dried under an argon stream to afford 2.0 g of a white powder as the catalyst (B-32).

The catalyst was analyzed and found to contain 2.1 wt. % Ti, 21.6 wt. % Mg, 0.13 wt. % Al, 8.8 wt. % Cl, 1.9 wt. % Si, the balance being C, H, and O which was not determined.

The catalyst B-32 has not been used to polymerize any monomer. Based on the analyzed results showing the presence of titanium and by analogy with other related titanium-containing catalysts of this invention there is no doubt but that it would be an active 1-olefin polymerization catalyst.

EXAMPLE XII

Ethylene Polymerization

A 3.8 liter, stirred, stainless steel reactor as described and conditioned in Example IV was employed for ethylene polymerization.

The conditioned reactor in each run was purged with dry isobutane, 1 cc of triethylaluminum cocatalyst solution (1 molar in n-heptane) was charged followed by addition of the catalyst. The reactor was closed, about 2 liters of dry isobutane was added to it, the reactor and contents were heated to the indicated temperature, ethylene and hydrogen, if used, were charged and the run was started. Each run was conducted for 60 minutes. Each run was terminated and the polymer recovered as described in Example IV.

In run 61, the initial ethylene pressure was 0.79 MPa (115 psia) and no hydrogen was present. In run 62 the initial ethylene pressure was 1.5 MPa (215 psia) and the initial hydrogen pressure was 0.45 MPa (65 psia).

The quantity of each catalyst employed, conditions used, and results obtained are presented in Table 12.

TABLE 12

| | Catalyst | | Ethylene Polymerization Reactor | | Polymer Yield, g | Calculated Productivity kg/g/hr |
|---|---|---|---|---|---|---|
| Run No. | No. | Weight, g | Temp. °C. | Pressure, total, MPa | | |
| 61 | A-31 | 0.0154 | 80 | 2.00 | 70 | 4.55 |
| 62 | B-30 | 0.0175 | 100 | 3.37 | 440 | 25.1 |

The results obtained are generally in line with those for the other invention catalysts employing the specific organoaluminum compounds as the precipitating agent. The results indicate that the scope of the precipitating agents usefully employable in this invention can be as earlier described.

EXAMPLE 13

Catalyst Preparation

A series of catalysts was prepared in a Pfaudler reactor following the general teaching disclosed above in Example 10 and in addition including the prepolymer feature of this invention for all invention catalysts.

Catalyst B-33: 15.8 wt. % prepolymer.

Under a nitrogen atmosphere, a 30 gal (113.6 L) Pfaudler reactor was charged with about 19 gal (72 L) of dry n-hexane, 1085.8 g (11.41 moles) of dry MgCl$_2$ passed through a 50 mesh screen (U.S. Sieve Series), and 12.0 lbs. (23.86 moles) of titanium tetraethoxide (Ti(OEt)$_4$). The mixture was heated to 90° C. and held at that temperature for 30 minutes while stirring. The mixture was then cooled to about 30° C. and while stirring, 26.0 lbs. (12.49 moles) of ethylaluminum sesquichloride (EASC) as a 26.2 wt. % solution in n-heptane, was added over a 67 minute period of time. The reaction mixture was stirred an additional 20 minutes, stirring was discontinued and the slurry allowed to settle after which it was washed twice by decantation with about 15 gal. (57 L) portions of dry n-hexane. Following the second decanting, about 10 gal. (38 L) of dry n-hexane was added to the mixture, and while still maintaining a nitrogen atmosphere above it the mixture was left overnight.

The next morning the reactor was purged of nitrogen with dry ethylene. Whle under an ethylene pressure of 65 psia (0.45 MPa), the contents at a temperature of about 30° C. were treated with 1.0 lb (0.48 moles) of the EASC solution while stirring, the total time consumed being 30 minutes. Stirring was stopped, the reactor was purged with nitrogen, the solids allowed to settle, mother liquor decanted and the solids washed twice with about 10 gal. per wash of dry n-hexane.

Following the second decanting an additional 10 gallon portion of dry n-hexane was added to the reaction mixture plus 14.0 lbs. (33.47 moles) of TiCl$_4$. The mixture at a temperature of about 30° C. was stirred for one hour, stirring was stopped, and the solids allowed to settle. The mother liquor was decanted and the solids washed 4 times with decanting with about 10 gal of dry n-hexane per wash as before. The slurry still under a nitrogen blanket was transferred to a receiver for storage. Subsequent analysis of a portion of the product revealed that the prepolymer content (dry basis) was 15.8 wt. %. The estimated titanium content of the catalyst is in the 11–13 wt. % range based upon results obtained for related catalysts made in a similar fashion.

The Ti(OEt)$_4$:MgCl$_2$ mole ratio was 2.09 and the Ti(OEt)$_4$:EASC mole ratio was 1.91.

Catalyst B-34: 12.2 wt. % prepolymer

Under a nitrogen atmosphere, the Pfaudler reactor was charged with about 8.5 gal. (32 L) of dry mixed xylenes (as commercially furnished), 1148.6 g (12.06 moles) of dry sieved (as before) MgCl$_2$, and 12.0 lbs. (23.86 moles) of Ti(OEt)$_4$. As for invention catalyst B-33, the mixture was heated to about 90° C. and held there for 30 minutes while stirring. The mixture was then cooled to about 30° C. and held at that temperature while 26.0 lbs. (12.49 moles) of the 26.2 wt. % EASC solution was added over a 65 minute period while stirring, and stirring was continued an additional 20 minutes after addition of the EASC was completed. Agitation was stopped, the solids allowed to settle, mother liquor decanted, the solids washed one time with 15 gal (57 L) of dry n-hexane, the supernatant liquid removed by decanting and about 15 gal. of dry n-hexane was added. The mixture was then left undisturbed overnight like the previous preparation of catalyst B-33.

The next morning, approximately 15 gal. of the supernatant liquid was decanted and replaced with about 10 gal. of fresh, dry n-hexane. The nitrogen atmosphere in the reactor was then purged with dry ethylene leaving an ethylene pressure at 65 psia as before while adding to the stirred contents at about 30° C., 1.0 lb (0.48 mole) of the EASC solution with the total time consumed for the operation of 30 minutes. Stirring was stopped, the reactor purged with nitrogen, the solids allowed to settle, mother liquor decanted, and the solids washed twice with about 10 gal. per wash of dry n-hexane. Following the second decanting, an additional 10 gal. portion of dry n-hexane was added to the reaction mixture along with 14.3 lbs (34.19 moles) of TiCl$_4$. The mixture at a temperature of about 30° C. was then stirred for one hour, agitation was stopped, the solids allowed to settle, and the mother liquor decanted. As before, the solids were washed 4 times with decanting with about 10 gal. of dry n-hexane per wash and the final product transferred still under a nitrogen blanket to a receiver for storage. Subsequent analysis revealed that the prepolymer content of the catalyst (dry basis) was 12.2 wt. % and the titanium content was 11.5 wt. %.

The Ti(OEt)$_4$:MgCl$_2$ mole ratio was 1.91.

Catalyst B-35: No prepolymer.

Under a nitrogen blanket, the Pfaudler reactor was charged with about 19 gal. (72 L) of dry n-hexane, 1140.6 g (11.98 moles) of dry sieved (as before) MgCl$_2$, and 12.0 lbs. (23.86 moles) of Ti(OEt)$_4$. The stirred mixture was heated to 90° C. and maintained at 91° C.±1° C. for 45 minutes and then cooled to 30° C. Then 25.0 lbs. (12.00 moles) of the 26.2 wt. % EASC solution was added to the stirred mixture over a 120 minute period while maintaining a temperature of 29° C.±1° C. The mixture was stirred an additional hour, stirring was stopped and the solids were allowed to settle. The mother liquor was decanted and the solids were washed twice with about 15 gal. of dry n-hexane per wash leaving the mixture and the second wash liquid in the reactor overnight in undisturbed fashion under nitrogen.

The next morning the supernatant liquid was decanted and the solids washed twice more with decanting with about 15 gal. portions of dry n-hexane. Following the last decanting about 15 gal. of fresh dry n-hexane and 25.0 lbs. (59.77 moles) of TiCl$_4$ were added. The stirred mixture was held at 30° C. for 1 hour, agitation was stopped, and the solids allowed to settle. As before, the product was washed with decanting 4 times with about 15 gal. dry n-hexane per wash, leaving the fourth wash in place overnight. The next morning the supernatant liquid was decanted and the product slurry transferred under nitrogen to a receiver for storage. As for catalyst B-33, the estimated titanium content of catalyst B-35 is in the 11-13 wt. % range.

The Ti(OEt)$_4$:MgCl$_2$ mole ratio was 1.99:1 and the Ti(OEt)$_4$:EASC mole ratio was 1.99:1.

EXAMPLE 14

Ethylene Polymerization

Portions of each catalyst were employed in polymerizing ethylene in a 1 gal. (3.8 L) stirred reactor at 100° C. and 1 hour, and in a 11.3 gal. (42.8 L) loop reactor at the indicated temperatures for about 1 hour. The use of the small 3.8 liter loop reactor and isolation of the polymer is described above in Example 4. The use of the 42.8 L loop reactor and isolation of the polymer is as described in Example 16. Polymer fines were determined as that portion of each dry, recovered polyethylene passing through a 100 mesh screen (U.S. Sieve Series).

The conditions employed in the small reactor and the results obtained are given in Table 14A. In each run, 0.5 mL of triethylaluminum (TEA 0.5 mmole TEA) as a 15 wt. % solution in n-heptane was used as the cocatalyst. Polymer fines are based on dry reactor product ground in a stainless steel Waring Blendor, Model 31 BL 42, operated at speed setting 7 (highest speed).

The conditions employed in the loop reactor operating in the liquid full condition at steady state conditions, at a nominal reactor pressure of 4.10 MPa (595 psia), agitator speed of 1850 RPM, and production rate of about 15 lbs/hour polyethylene are shown in Table 14B. Polymer fines are based on dry as made polymer that was sieved. It has been found that grinding the recovered, dry loop reactor product in a Waring Blendor does not significantly increase the amount of polymer fines.

TABLE 14A

ETHYLENE POLYMERIZATION, 3.8 LITER STIRRED REACTOR

| | Catalyst | | | Pressures, MPa[a] | | | | | Polymer |
|---|---|---|---|---|---|---|---|---|---|
| Run No. | Prepolymer Wt. % | No. | Weight Cgd mg | H$_2$ | Ethylene | Total | Prod.[b] Kg/g | MI | Wt. % Fines[c] |
| 63 | 15.8 | B-33 | 44 | 0.448 | 1.48 | 3.72 | 103 | 0.38 | 27 |
| 64 | 15.8 | B-33 | 39 | 0.931 | 1.48 | 4.14 | 77.9 | 11.1 | 40 |
| 65 | 12.0 | B-34 | 14 | 0.448 | 1.48 | 3.69 | 94.0 | 0.93 | 32 |
| 66 | 12.0 | B-34 | 20 | 0.896 | 1.48 | 4.14 | 65.0 | 9.4 | 35 |
| 67 | 0 | B-35 | 89 | 0.448 | 1.48 | 3.76 | 57.9 | 1.4 | 31 |
| 68 | 0 | B-35 | 49 | 0.931 | 1.48 | 4.48 | 66.7 | 10.2 | 36 |

[a]Hydrogen partial pressure charged to reactor from a 360 mL bomb.
Ethylene partial pressure charged to reactor.
Average pressure during the run based on psia.
[b]Kilograms polymer per g catalyst per hour.
[c]Dry polymer ground 2 minutes in Waring Blendor at high speed.

TABLE 14B

ETHYLENE POLYMERIZATION, 42.8 Liter Loop Reactor

| | Run No. | | |
|---|---|---|---|
| | 69 | 70 | 71 |
| Catalyst No. | B-33 | B-34 | B-35 |
| Wt. % Prepolymer on Catalyst | 15.8 | 12.0 | 0 |
| Rounds/Hour Catalyst Charged | 15.4 | 13.5 | 8.9 |
| Cocatalyst Conc (ppm based on diluent) | 34.5 | 20.2 | 21.2 |
| Reactor Temp. °C. | 100.3 | 102.0 | 103.5 |
| Ethylene Concentration, Mole Percent | 6.2 | 6.1 | 6.1 |
| Hydrogen Concentration, Mole Percent | 0.85 | 0.86 | 0.77 |
| Calculated Wt. % Solids | 28.8 | 29.6 | 28.8 |
| Productivity, kg/g catalyst | 89.3 | 121.0 | 92.1 |
| Polymer Melt Index | 30.3 | 30.3 | 31 |
| Polymer Density, g/cc | 0.964 | 0.964 | 0.966 |

TABLE 14B-continued

ETHYLENE POLYMERIZATION, 42.8 Liter Loop Reactor

| | Run No. | | |
|---|---|---|---|
| | 69 | 70 | 71 |
| Polymer Fines, Wt. % Less than 100 Mesh | 11 | 12 | 57 |
| Polymer Bulk Density, lbs/ft$^3$ (g/cc) | 28.7 (0.460) | 28.5 (0.457) | 33.0 (0.529) |

[d]0.08 mL/round
[e]0.05 mL/round

The results shown in Table 14A demonstrate that as the polymer melt index increases the amount of fines resulting from the grinding test also increases. Thus, in comparing results it is preferable to do so with polymers having about the same melt index. Since more fines can be expected from high melt index polymer, e.g. about 10 or higher, than from low melt index polymers, e.g. about 1 or lower, it is more convenient in differentiating catalyst performance to focus on high melt index polymer results. Therefore, in this series runs 64, 66 and 68 can be compared and they appear to show no advantage for prepolymer on the catalyst based on the Waring Blendor or polymer grinding test. A significant difference can exist, however, between polymer formed in bench scale polymerization processes and polymer formed in a continuous processes such as, for example, in a loop flow reactor. The difference is that in the bench scale polymerization process the growing polymer is relatively undisturbed on the catalytic site whereas in the continuous polymerization process the growing polymer on the catalyst is subject to shearing forces. Consequently, the grinding test as performed on bench scale polymer product can be regarded as a measure of the relative toughness of the mature polymer particle. To the extent that fines produced in any polymerization process are a function of the toughness of the mature polymer particle, the grinding test can provide accurate predictive information as to the fines produced. To the extent, however, that the fines produced are a function of some other factor such as, for example, fragility of the catalyst particle itself during polymerization, the Waring blender or grinder test results will not necessarily be predictive of pilot plant or commercial plant applications. In practice this means, as has been observed, that good Waring Blendor or grinder test results have generally very good predictive value as to pilot plant or commercial reactor conditions, but that bad results of the Waring Blender or grinder test do not necessarily indicate that the polymer produced in pilot plant or commercial reactors will have high fines.

Hence, the catalysts according to the invention were tested in a (pilot plant) loop reactor. As noted, it is speculated that the polymer grinding test with polymer produced on a bench scale in a stirred reactor gives a measure substantially only of the toughness (integrity) of the agglomerated polymer associated with each catalyst particle and does not necessarily indicate the toughness of the catalyst particle per se. In a stirred bench scale lab reactor, as indicated, the catalyst particles are subjected to relatively mild impeller forces, e.g. impeller speed of 500 to 1150 RPM for a brief period of time before they are protected by the growing polymer layer on each particle. On the other hand, in a loop reactor operating on a continuous basis, for example, the catalyst particles are subjected to much greater shearing forces since the impeller is operated at relatively high speeds, e.g., 1800 RPM, to get good mixing throughout the loop. Also, catalyst is charged intermittently or continuously to the reactor and therefore catalyst and polymer particles are present having a wide distribution of residence times. The as formed polymer in the pilot plant loop reactor system correlates positively with as formed polymer made in large commercial reactors. Regardless of the mechanism involved in polymer particle size formation in such reactors it has been found that the catalyst containing from about 5 to about 20 wt. % or more prepolymer performs very well in the reactors and the amount of polymer product fines is substantially reduced. This is demonstrated in invention runs 69 and 70 of Table 14B compared to controls run 71 where the catalyst contained no prepolymer, all polymer produced having about the same melt index of 30-31. The invention catalysts produced polymer containing 11-12% fines whereas the polymer made with the control catalyst contained 57 wt. % fines.

Since excessive fines can produce serious handling problems and present an explosion danger as well, it can be appreciated that the invention catalysts constitute a desirable advance in performance from a technical as well as a safety viewpoint. The higher bulk density of 33 lbs/ft$^3$ of control run 71 compared to the about 28.5 lbs/ft$^3$ for the invention runs 69, 70 can be misleading if viewed from the values alone. The higher bulk density results from the finer particles packing together in the tests. However, the fine particles settle out slower in the reactor settling legs than larger particles thus complicating polymer recovery. The dried, recovered fines also are different to feed evenly to an extruder because of bridging and the like and pneumatic transfer of the fines is accomplished with difficulty.

EXAMPLE 15

Catalyst Preparation

Catalyst B-36—Control catalyst prepared in an ethylene atmosphere without subsequent prepolymer formation. In a dry box, a 10 ounce (255 mL) bottle was charged with 1.92 g (0.0202 mole) of MgCl$_2$, 9.12 g (0.0400 mole) of titanium tetraethoxide (Ti)OEt)$_4$) and 50 mL of mixed xylenes. The bottle was capped, removed from the dry box and heated for 30 minutes at 109° C. while stirring to produce a solution. The solution was cooled to about 25° C., the interior of the bottle was flushed with ethylene through a needle inserted through the cap and pressured to 6 psi (41 kPa) with ethylene which was maintained during a subsequent reaction of the contents with a solution of ethylaluminum sesquichloride (EASC). The stirred contents of the bottle were treated by dropwise addition of 30 mL (0.0235 mole) of 0.783 molar EASC in n-heptane through a needle inserted through the bottle can cap over a 3 hour period while maintaining the reaction contents at about 25° C. with cooling. The bottle was returned to the dry box and the slurry contained therein was suction filtered, and the filter cake washed with 120 mL of n-hexane. The product was flushed overnight under an argon stream to afford 5.65 g of a tan powder.

A bottle was charged with 2.74 g of the tan powder and slurried with 30 cc of n-hexane. The contents were then charged with 7 mL (12.1 g) of TiCl$_4$ and stirred for 1 hour at 25° C. The contents were suction filtered in the dry box as before, the filter cake washed with 50 mL of n-hexane, and the product dried under an argon stream to yield 2.60 g of a gritty appearing light brown powder.

Catalyst B-37—Control catalyst prepared in absence of a 1-olefin atmosphere but containing prepolymer. In a dry box, a 10 ounce bottle was charged with 1.90 g (0.0200 mole) of MgCl$_2$, 9.37 g (0.0411 mole) of Ti(OEt)$_4$ and 50 mL of xylene. The bottle was capped, removed from the dry box and heated for 45 minutes at 92° C. while stirring to produce a solution. The solution was then cooled to about 25° C. and while stirring the contents were treated with the dropwise addition of 30 mL (0.0235 mole) of 0.783 molar EASC introduced to the bottle by means of a needle inserted through the cap. The addition time required 2¾ hours while maintaining the reaction contents at about 25° C. by means of cooling, when required. The bottle was returned to the dry box and the precipitate which had formed was recovered by suction filtering. The filter cake was washed with a little fresh xylene and then 60 mL of n-hexane and the product partially dried to a wet weight of 12.9 g. A 6.4 g portion of the wet product was dried under an argon stream to afford 2.85 g of a light brown powder. The remaining 6.5 g portion of the wet product was charged to a 10 ounce bottle and slurried with 30 mL of n-hexane. The bottle was capped, removed from the dry box and its interior flushed with ethylene for 30 minutes at 25° C. while maintaining the internal pressure of the bottle at 5 psi (kPa) with the ethylene. The ethylene flow was stopped and the product was washed twice by adding about 150 mL portions of n-hexane to the bottle, stirring the contents, letting the product settle and pumping out about 150 mL of the liquid. Then 4.6 mL (7.9 g) of TiCl$_4$ was added to the bottle and the contents still at 25° C. were stirred for one hour. Stirring was discontinued, the bottle transferred to the dry box and the precipitate recovered by suction filtration. The filter cake was washed with 50 mL of n-hexane, and dried under an argon stream to yield 4.29 g of a brown flakey powder. It was estimated that the catalyst contained 54% polyethylene (propolymer) by weight as an adherent coating.

Catalyst B-38—Invention (rapid addition) catalyst prepared in an ethylene atmosphere and also containing an adherent polyethylene (prepolymer) coating. In a dry box a 10 ounce bottle was charged with 1.93 g (0.0203 mole) of MgCl$_2$, 9.23 g (0.0405 mole) of Ti(OEt)$_4$ and 50 mL of xylene. The bottle was capped, removed from the dry box, and heated for 30 minutes at 106° C. while stirring to produce a solution. The solution was cooled to about 25° C., the interior flushed with ethylene and pressured to 7 psi (48 kPa) with ethylene, and the ethylene flow was stopped. The contents were treated by the dropwise addition of 25 mL of 0.783 molar EASC (0.0196 mole) over a 40 minute period while stirring and maintaining the reaction temperature at about 25° C. Stirring was continued 10 more minutes, then discontinued and the bottle was transferred to the dry box where the precipitate was recovered by suction filtration. The white filter cake was washed with a little fresh xylene, then with 60 mL of n-hexane, and the product partially dried to a wet weight of 10 g. Five grams of the product was dried under an argon stream to afford 2.05 g of a white powder. The remaining 5 g of the wet product was charged to a 10 ounce bottle and slurried with 50 mL of n-hexane. The bottle was capped, removed from the dry box and charged at 25° C. with 1 mL of 0.783 molar EASC through a needle inserted through the cap. While maintaining the temperature the bottle interior was flushed with ethylene and pressured with ethylene to 5 psi (34 kPa) while the contents were stirred for 20 minutes. Ethylene flow and stirring were discontinued and the slurry allowed to settle. The mother liquor was removed by suction and the slurry washed with 2 portions of n-hexane using 100 mL portions and removing the wash liquor as before leaving enough solvent to approximate the slurry volume in the last wash. Then 5 mL (8.6 g) of TiCl$_4$ was added to the contents of the bottle and the mixture was stirred for 1 hour at 25° C. Stirring was stopped, the bottle transferred to the dry box, and the precipitate recovered by suction filtration. The filter cake was washed with 60 mL of n-hexane and dried under an argon stream to yield 2.05 g of a grayish flakey solid. It was estimated that the catalyst contained 36.5 wt. % polyethylene coating. The various mole ratios employed in preparing catalysts B-36, B-37, and B-38 are:

| Catalyst: | B-36 | B-37 | B-38 |
|---|---|---|---|
| Ti(OEt)$_4$: MgCl$_2$ | 1.98 | 2.06 | 2.00 |
| EASC: MgCl$_2$ | 1.16 | 1.18 | 0.966 |

Catalyst B-39—Invention catalyst prepared in four separate runs in a 30 gal (114 L) Pfaudler reactor in an ethylene atmosphere and containing an adherent polyethylene coating (prepolymer). In a typical run about 8 gal (30 L) of dried and deoxygenated commercial grade xylene was charged to the reactor along with 1155.8 g (12.1 moles) of MgCl$_2$ and 5443.2 g (23.9 moles) of Ti(OEt)$_4$). While stirring, the contents were heated to 100° C., held for 30 minutes at that temperature and then cooled to 30° C. The reactor was purged with ethylene and a pressure of 25 psia (0.17 MPa) ethylene maintained as over a 45 minute period, 10,886.4 g of a 27.2 wt % solution of EASC in n-heptane was added. The solution contained 2961.1 g (11.9 moles) of EASC. The mixture was kept at 30°+2° C. by cooling during the reactor. Stirring was continued an additional 30 minutes, then stopped, the slurry was allowed to settle and the mother liquor removed by decanting. The slurry was washed twice with about 10 gal (38 L) portions of n-hexane per wash by decanting as before. About 10 gal of fresh n-hexane was added to the slurry, the reactor was purged with ethylene and left under 65 psia (0.45 MPa) ethylene pressure. While stirring, 49.4 g of EASC was added (181.4 g of the 27.2 wt % solution previously used), the ethylene pressure was increased to 115 psia (0.79 MPa) and maintained at that pressure for 30 minutes at 30° C. Stirring was stopped, ethylene pressure released, and the slurry was allowed to settle. As before the mother liquor was decanted, the slurry washed twice with 10 gal portions of n-hexane as before. After adding 10 gal of fresh n-hexane to the washed slurry, stirring was resumed as 6350.4 g of TiCl$_4$ was added. The mixture was stirred for 1 hour while at 30° C. Stirring was stopped, the slurry allowed to settle, mother liquor decanted, and the slurry washed as before with 4 portions of about 10 gal of n-hexane per portion. The washed slurry was transferred to a receiver. Three more catalyst samples were prepared in a generally similar fashion and the 4 samples combined. The blended catalyst sample was analyzed and determined to contain 3.6 wt % adherent polyethylene and the titanium content was 12.7 wt %.

Catalyst B-40—Invention catalyst prepared in three separate runs in the 30 gal Pfaudler reactor in an ethylene atmosphere following the general procedure described under catalyst B-39 except that in the prepolymer formation step an ethylene pressure of 65 psia (0.45 MPa) was used. The catalyst sample was analyzed and found to contain 7.0 wt % adherent polyethylene and the titanium content was found to be 12.5 wt %.

The various mole ratios employed in preparing Catalyst B-39 and B-40 averaged:

| Catalyst: | B-39 | B-40 |
|---|---|---|
| Ti(OEt)$_4$: MgCl$_2$ | 2.00 | 2.02 |
| EASC: MgCl$_2$ | 1.00 | 1.01 |

EXAMPLE 16

Ethylene Polymerization

Individual runs were conducted in a 3.8 L (1 gal) reactor containing 2 L isobutane as diluent, 1 cc triethylaluminum (15 wt % in n-heptane, 1 mmole) as the cocatalyst, the indicated amount of catalyst, 0.70 mole of hydrogen, and 1.48 MPa (215 psia) partial pressure of ethylene (unless indicated otherwise). The runs were carried out for 1 hour at 100° C. A nominal reactor pressure of about 515–535 psia (3.55–3.69 MPa) was maintained during polymerization by supplying ethylene to the reactor as required. In a given run a constant pressure was employed.

Polymerization was terminated by stopping ethylene flow to the reactor and flashing diluent, ethylene and hydrogen from the reactor. The reactor was opened and the polymer removed, dried and weighed to determine the yield.

Catalyst weights employed and results obtained are given in Table 16:

TABLE 16

| | | | | | | | |
|---|---|---|---|---|---|---|---|
| Ethylene Polymerization in 3.8 Liter Reactor | | | | | | | |
| | | | | Polymer | | Catalyst | |
| Run | Catalyst | | | Melt | Wt. %[a] | Productivity | |
| No. | No. | Wt., g | Yield, g | Index | Fines | kg/g/hr[b] | Remarks |
| 72 | B-36 | 0.0099 | 354 | 25 | 48 | 35.8 | Control |
| 73 | B-38 | .0121 | 81 | 28 | 23 | (13.4) 21.0[c] | Invention |

TABLE 16-continued

Ethylene Polymerization in 3.8 Liter Reactor

| Run No. | Catalyst No. | Catalyst Wt., g | Polymer Yield, g | Polymer Melt Index | Wt. %[a] Fines | Catalyst Productivity kg/g/hr[b] | Remarks |
|---|---|---|---|---|---|---|---|
| 74 | B-38 | .0132 | 444 | 40 | 19 | (33.6/2.5 hr) 21.1[d] | Invention |
| 75 | B-37 | .0143 | 141 | 38 | 50 | (9.86) 21.4[e] | Control |

[a] Fines determined by agitating about 100g of polymer in a 1-quart (0.95L) Waring Blender at maximum speed for 2 minutes, shaking the product in a set of standard U.S. Sieves, and weighing the fines passing through the 100 mesh sieve.
[b] kg Polymer per g catalyst per hour.
[c] Run length actually 30 minutes. Assuming linear response for 1 hour the calculated productivity for the polyethylene-coated (36.5 wt. % polyethylene) catalyst is 13.4 kg/gcat/hr. The productivity of the polyethylene-free catalyst is calculated to be 21.0 kg/g/hr.
[d] Run length actually 2¾ hrs. Calculated productivity for the polyethylene-coated catalyst is 33.6 kg/g/2.5 hr. For the polyethylene-free catalyst the calculated productivity is 52.7 kg/g/2.5 hr. or 21.1 kg/g/hr.
[e] Calculated productivity of the polyethylene-coated (54% polyethylene) catalyst is 9.86 kg/g/hr and for the polyethylene-free catalyst is 21.4 kg/g/hr.

The results show that substantially less polymer fines are produced from the invention catalyst B-38 in invention runs 73 and 74 than in the control runs 72 and 75 based on the Waring Blender or grinding test with polymer made in the bench scale batch, lab-size reactor. The control catalyst B-36 of run 72 is made in the presence of ethylene but is not subsequently coated with polyethylene. The control catalyst B-37 of run 75 is made in the absence of ethylene but is coated subsequently with polyethylene. The invention catalyst B-38 is prepared in the presence of ethylene and is later coated with polyethylene.

High melt index polymer is prepared, e.g. greater than about 20 melt index in the polymerizations since fines production appears to be greater when producing such polymer and differences in catalyst behavior with respect to fines production are more apparent.

The difference in catalyst productivity based on the results obtained in run 72 versus runs 73 and 74 are believed to represent anomalous results sometimes observed in polymerization. However, results obtained in pilot plant work with similar catalysts indicate that the catalysts all possess about the same activity in ethylene polymerization with the invention catalysts producing substantially less fines than control catalysts.

EXAMPLE 17

Ethylene Polymerization

A series of runs was conducted in a liquid full 42.8 L (11.3 gal) loop reactor containing isobutane as diluent for 1 hour after establishing equilibrium, at a nominal reactor pressure of 4.10 MPa (595 psia) and a nominal reactor temperature of about 100° C. Effluent was periodically discharged from the reactor and passed to flash chamber where the polymer was recovered, dried and sieved. Diluent was intermittently admitted to the reactor along with a dilute solution of triethylaluminum in n-hexane, e.g. 0.5 wt % in n-hexane, and intermittent addition of catalyst sufficient to maintain the production rate desired. Hydrogen was used as a molecular weight modifier for the polymer. The calculated solids level in the reactor was maintained at about 28 wt %. A polymer production rate of about 15 lbs/hr polyethylene was obtained during the runs. Circulation in the reactor was accomplished by means of an agitator operating at 1850 RPM in each run.

The conditions employed and results obtained are shown in Table 17.

TABLE 17

Ethylene Polymerization in Loop Reactor

| Run No. (Invention Runs) | 76 | 77 | 78 |
|---|---|---|---|
| Catalyst No. | B-39 | B-40 | B-40 |
| Wt. % Prepolymer on Catalyst | 3.6 | 7.0 | 7.0 |
| Rounds/Hour Catalyst Charged | 9 | 35 | 35 |
| Cocatalyst Conc (ppm based on diluent) | 20.2 | 19.4 | 19.8 |
| Reactor Temp. °C. | 102.5 | 101.8 | 102.0 |
| Ethylene Concentration, mol percent | 6.24 | 7.23 | 6.50 |
| Hydrogen Concentration, mol percent | 0.997 | 0.79 | 0.74 |
| Calculated Wt % Solids | 29.1 | 29.3 | 28.0 |
| Polymer Melt Index | 32.0 | 29.7 | 31.8 |
| Polymer Density, g/cc | 0.9645 | 0.9647 | 0.9647 |
| Polymer Fines, wt % less than 100 mesh | 15 | 14 | 10 |
| Polymer Bulk Density, lbs/ft³ (g/cc) | 31.3(0.50) | 29.6(0.47) | 30.0(0.48) |

The data show that polyethylene of acceptable commercial quality is prepared having low polymer fines, e.g. 10–15%, in a loop reactor in a continuous process with catalyst of the instant invention. In contrast, when polyethylene of about 30 melt index is produced in the loop reactor under similar condition with catalyst prepared in the absence of ethylene and no prepolymer the amount of polymer fine ranges from about 40–60 wt. %.

As indicated above the Waring Blendor polymer grinding test is believed to give a measure of the toughness (resistance to attrition) of the mature polymer particle rather than measure the toughness of the catalyst particle itself. Experience has now shown that the catalysts employed in the bench scale lab batch reactor to produce polymers exhibiting low fines according to the grinding test will, in general, predict production of polymers in the loop reactors exhibiting low fines contents. The reverse is not necessarily true. Thus screening catalysts based solely on negative results of the grinding test must be viewed with caution.

EXAMPLE 18

Catalyst Preparation: Catalyst B-41

In a 4-liter glass kettle 0.28 mole of magnesium chloride, dried at 200° C. and roll-milled, were slurried with 0.56 mole of ethyl titanate and 0.7 liters of xylenes. The mixture was heated for b 2.5 hours at 54°–100° C. and then cooled to 35° C. The kettle was flushed with ethylene gas for 10 minutes. The kettle could not be pressurized to 25 psia because of leaks between the plates of the kettle.

At a solution temperature of 32.5° C. and a stirring rate of 150 rpm, 0.27 moles of EASC in heptane were added over six minutes to the solution through a 19 gauge needle. The temperature of the slurry increased to 50° C. The stirring rate of the slurry was 156 rpm. As soon as the addition of the EASC was complete, stirring of the slurry was terminated. The slurry consisted of large, brown particles which did not settle. The slurry stood for 45 minutes. On gentle stirring, the slurry was very "gel-like." More rapid stirring broke up the slurry.

Under purging nitrogen, the reaction solution was removed and the remaining solid was rinsed twice with 0.7 liter portions of hexane.

0.7 Liter of hexane was added to the brown slurry. To this stirred slurry was added 0.03 mole of EASC in heptane. The kettle was purged with ethylene for 42 minutes. The temperature of the slurry slowly increased from 25.5° C. to 36° C. The slurry was stirred at 200–300 rpm. The higher rpm was required to insure better mixing since the slurry did not stir at low rpm. At the end of the polymerization, the slurry consisted of discrete, large particles that did not settle.

The dark, orange solution was removed from the precipitate; the precipitate was rinsed with 0.7 liter of hexane, slurried with 0.7 liter of hexane, and stored overnight under nitrogen.

To the stirred slurry were added 143 g (2:1 calculated weight ratio of $TiCl_4$ to precipitate). The dark brown slurry was stirred at room temperature for one hour. The dark red liquid was removed from the solid, and the solid was rinsed with five 0.7 liter portions of hexane. Throughout these filtrations, the solid was very easily filtered. Although the solid did not rapidly settle before the $TiCl_4$ wash, the solid did settle better after the $TiCl_4$ wash.

The brown solid (catalyst B-41) was isolated in the dry box, dried under vacuum and then weathered to a weight of 124.4 g.

EXAMPLE 19

Polymerization

Polymerization was carried out as described above in the 3.8 L (1. gal.) reactor as described generally in Example 16 for runs 79–82. Polymerization in run 83 was carried out in the (pilot plant) 42.8 L (11.3 gal.) loop reactor as described generally in Example 17. The catalysts used, source, and results are shown in Table 19.

TABLE 19

| Run | 79[a] | 80[a] | 81[a] | 82[b] | 83[b] |
|---|---|---|---|---|---|
| Catalyst No. | B-41 | B-41 | B-41 | B-42 | B-42 |
| EASC Addition Time (minutes) | 6 | 6 | 6 | 3 | 3 |
| Melt Index | 27.2 | 52 | 11.1 | 13 | 29 |
| Wt. % Fines | 14.6[d] | 13.2[d] | 23.4[d] | 22[d] | 8.2[e] |

[a]Catalyst prepared in a one-gallon glass reactor as described in Example 18.
[b]Catalyst prepared in a thirty-gallon Pfaudler reactor as described generally in Example 13 with the EASC time as indicated in the presence of an ethylene atmosphere and with prepolymerization.
[c]Determined as that portion of polymer particles passing through a 100 mesh (U.S. Standard) sieve.
[d]As determined from the Waring Blendor grinding test.
[e]As made.

Scanning Electron Microscope Study of Polymer

EXAMPLE 20

Scanning Electron Microscope Study of Polymer

Figure 2:
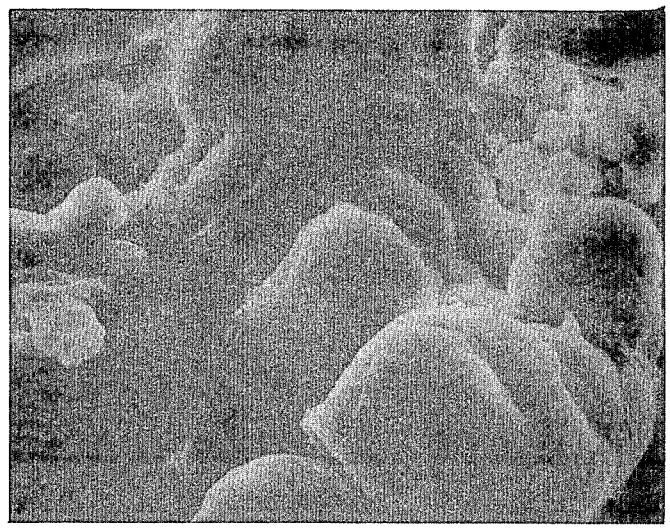
FIG. 2 is a Scanning Electron Micrograph of polymer particles made with a catalyst according to the invention wherein the addition time was 10 minutes and the first and second catalyt components were mixed in the absence of an olefin atmosphere and without prepolymerization, at 1000× magnification.
Figure 3:
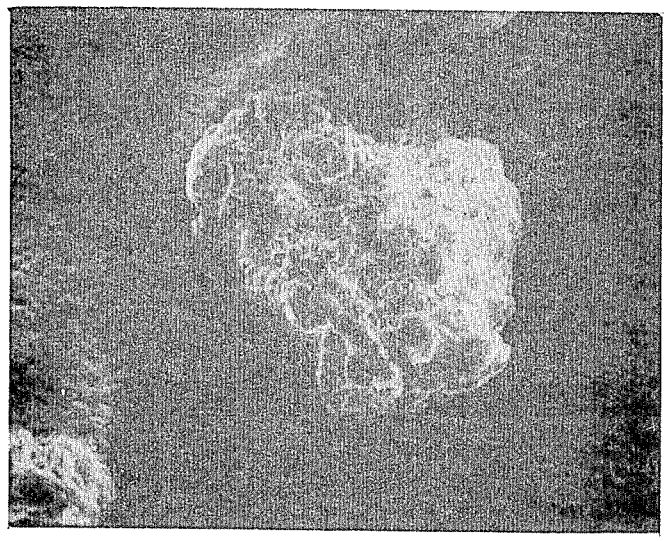
FIG. 3 is a Scanning Electron Micrograph of polymer particles made with a catalyst according to the invention wherein the addition time was 10 minutes and the first and second catalyst components were mixed in the presence of an olefin atmosphere and with prepolymerization, at 100× magnification.
Figure 4:
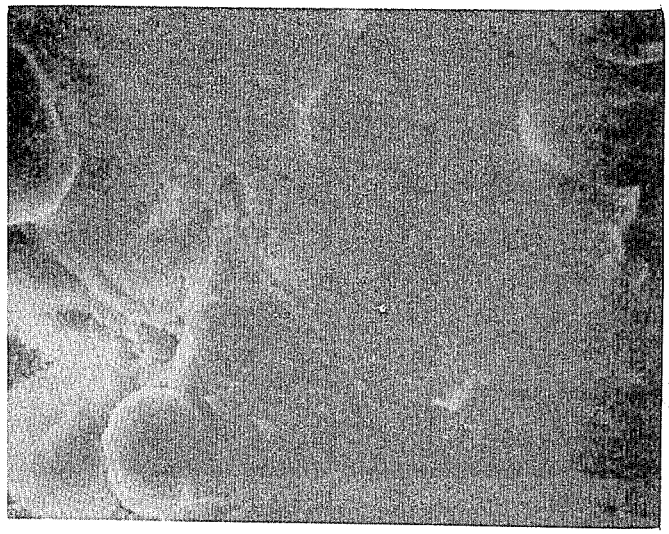
FIG. 4 is a Scanning Electron Micrograph of polymer particles made with a catalyst according to the invention wherein the addition time was 10 minutes and the first and second catalyst components were mixed in the presence of an olefin atmosphere and with prepolymerization, at 1000× magnification.
Figure 5:
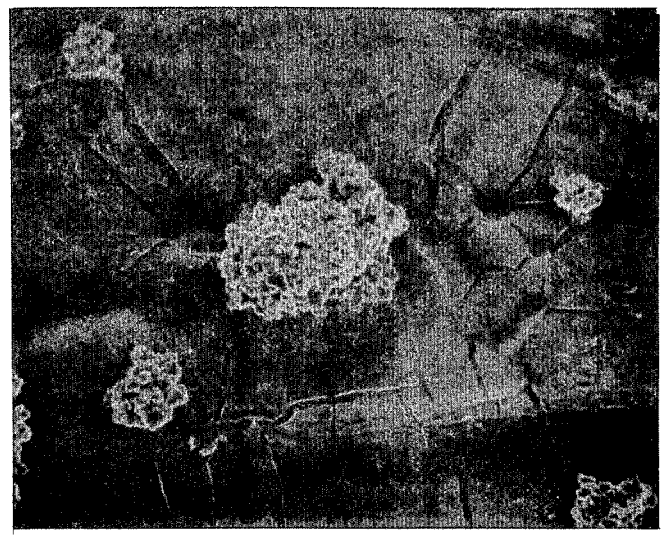
FIG. 5 is a Scanning Electron Micrograph of polymer particles made with a catalyst according to the invention wherein the addition time was 40 minutes and the first and second catalyst components were mixed in the presence of an olefin atmosphere and with prepolymerization, at 100× magnification.
Figure 6:
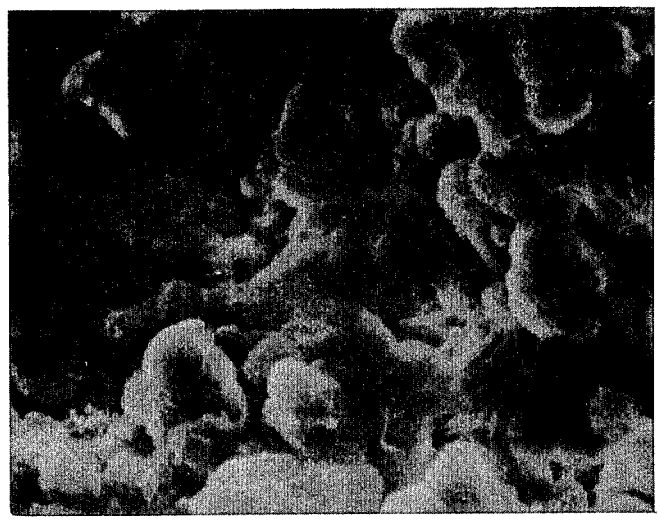
FIG. 6 is a Scanning Electron Micrograph of polymer particles made with a catalyst according to the invention wherein the addition time was 40 minutes and the first and second catalyst components were mixed in the presence of an olefin atmosphere and with prepolymerization, at 1000× magnification.
Figure 7:
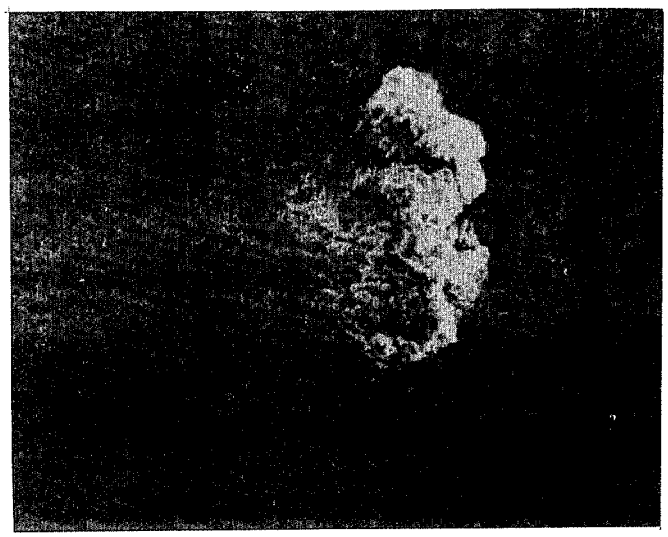
FIG. 7 is a Scanning Electron Micrograph of polymer particles made with a control catalyst, at 100× magnification.
Figure 8:
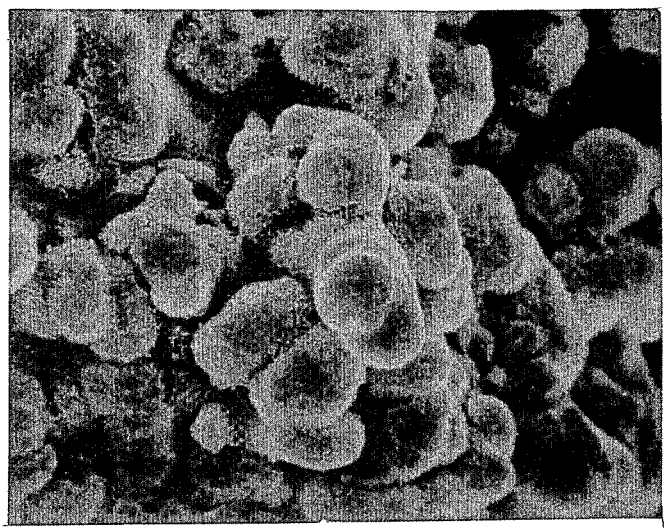
FIG. 8 is a Scanning Electron Micrograph of polymer particles made with a control catalyst, at 1000× magnification.

Scanning Electron Microscope micrographs were made on polymer particles prepared from catalysts prepared generally in accordance with Example 15 rapid addition catalysts except that a 10 minute addition time of the second catalyst component (EASC, ethylaluminum sesquichloride) to the first catalyst component solution was employed, and in the absence of an ethylene atmosphere and without prepolymerization. FIG. 1 and FIG. 2 show the results at 100× and 1000× magnification respectively. Micrographs were also made on polymer particles prepared from catalysts having a 10 minute EASC addition time in the presence of an ethylene atmosphere and prepolymerization prepared generally in accordance with the rapid addition catalysts of Example 15 except that a 10 minute addition time was employed. FIG. 3 and FIG. 4 show the results at 100× and 1000× magnification respectively. Micrographs were also made of polymer particles having a 40 minute EASC addition time as in Example 15 in the presence of an ethylene atmosphere and with prepolymer. FIG. 5 and FIG. 6 show the results at 100× and 1000× magnification respectively. Micrographs were also made of polymer particles produced on a catalyst prepared without rapid addition, such as that generally set forth for Catalyst B-11, for example, as in Examples V, VI and VII above, as a control. The results are shown in FIG. 7 and FIG. 8 at 100× and 1000× magnification respectively.

These micrographs show that the polymer particles produced vary significantly in relation to addition time as herein described. The polymer particles prepared from the catalysts precipitated with the 10 minute addition time, FIGS. 1 through 4, (with or without ethylene atmosphere and prepolymerization) were tightly woven masses of solid polymer. The control micrographs, FIG. 7 and FIG. 8, prepared from catalysts prepared without rapid addition and without ethylene atmosphere and prepolymerization show loosely woven masses of spheres or "worms." The polymer particles prepared at 40 minutes addition time, FIG. 5 and FIG. 6, moreover, were relatively tightly woven, thus resembling FIGS. 1 through 4, yet resembling the controls of FIG. 7 and FIG. 8 in that the tiny spheres or "worms" are better defined than in FIGS. 1 through 4.

These observations are consistent with the relationship between addition time and polymer fines produced according to the invention as herein set forth and also with the interpretation that both rapid addition and prepolymerization act at least partly independently in producing catalysts capable of producing low fines polymers.

What is claimed is:

1. A process for producing a polyolefin comprising contacting at least one polymerizable compound selected from the group consisting of aliphatic mono-1-olefins, conjugated diolefins, and vinyl aromatic compounds under polymerization conditions with a cocatalyst comprising at least one organometallic compound selected from the group consisting of organometallic compounds of Groups I to III of the Periodic Table and a catalyst prepared by (A) preparing a first catalyst component by reacting in a suitable dry, essentially inert diluent reactants comprising
  (1) a metal halide compound selected from the group consisting of metal dihalide compounds and metal hydroxyhalide compounds and the metal of the metal halide compound is selected from the group consisting of Group IIA metals and Group IIB metals of the Mendeleev Periodic Table; and
  (2) a transition metal compound in which the transition metal is selected from the group consisting of Group IVB and Group VB transition metals of the Mendeleev Periodic Table and the transition metal is bonded to at least one radical selected from the group consisting of hydrocarbyloxides, amides, imides, and mercaptides; and
(B) reacting a solution of said first catalyst component with a second catalyst component in the presence of an atmosphere of a polymerizable olefin monomer selected from the group consisting of aliphatic mono-1-olefins and conjugated dienes at a pressure in the range of about 1 to about 1,000 psia, wherein the molar ratio of the transition metal compound to the metal halide compound is in the range of about 10:1 to about 1:10, and wherein the concentration of the metal halide in said diluent is in the range of about 0.2 molar to about 1.2 molar, and wherein said second catalyst component comprises a precipitating agent selected from the group consisting of organometallic compounds of Groups I, II, and III selected from the group consisting of lithium alkyls, Grignard reagents, dialkyl magnesium compounds, dialkyl zinc compounds, and hydrocarbyl aluminum halides; metal halides and oxyhalides of metals of Groups IIIA, IVA, IVB, VA, and VB; hydrogen halides; and organic acid halides selected from the group consisting of compounds having the formula

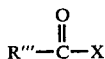

wherein R''' is an alkyl, aryl, or cycloalkyl group or combinations thereof and X is a halide, and wherein said precipitating agent is combined with said solution of said first catalyst component in either an undiluted form or as an admixture with a suitable essentially inert diluent, the concentration of said precipitating agent in said diluent being at least 0.2 molar, further wherein said solution of said first catalyst component and said second catalyst component are added together during an addition time of less than about two hours, and then
(C) reacting the solid product resulting from step (B), which optionally has been reacted with a halide ion exchanging source selected from the group consisting of titanium tetrahalides, vanadium oxychloride, and zirconium tetrachloride, with a polymerizable olefin selected from aliphatic mono-1-olefins and conjugated dienes in the presence of an adequate amount of a cocatalyst selected from the group consisting of organometallic compounds of Groups I to III of the Periodic Table to produce a catalyst containing 1 to 50 weight percent prepolymer.

2. A process according to claim 1 wherein the cocatalysts for the polymerization and the prepolymerization can be the same or different and are selected from the group consisting of lithium alkyls, Grignard reagents, dialkyl magnesium compounds, dialkyl zinc compounds, hydrocarbyl aluminum halides, and trihydrocarbyl aluminum compounds.

3. A process according to claim 2 wherein the solid product from step (C) is further treated with a halide ion exchanging source capable of enhancing the activity of the catalyst.

4. A method according to claim 3 wherein said halide ion exchanging source is selected from titanium tetrahalides, vanadium oxychloride, and zirconium tetrachloride.

5. A process according to claim 4 wherein said second catalyst component is selected from the group consisting of lithium alkyls, Grignard reagents, dialkyl magnesium compounds, dialkyl zinc compounds, and organoaluminum compounds.

6. A process according to claim 5 wherein said transition metal compound is selected from the group consisting of titanium tetraalkoxides of the formula $Ti(OR)_4$ wherein each R is individually selected from alkyl radicals containing 1 to 10 carbon atoms per radical.

7. A process according to claim 6 wherein said metal halide comprises magnesium dichloride.

8. A method according to claim 7 wherein the halide ion exchanging source is titanium tetrachloride.

9. A method according to claim 8 wherein said titanium tetraalkoxide is titanium tetraethoxide.

10. A process according to claim 9 wherein said precipitating agent comprises ethyl aluminum sesquichloride.

11. A method according to claim 10 wherein the addition time in step (C) is less than about 45 minutes and the catalyst produced contains about 3 to about 40 weight percent prepolymer.

12. A method according to claim 11 wherein the olefin employed to provide said olefin atmosphere is ethylene.

13. A method according to claim 12 wherein step (C) is conducted by contacting the product of step B with a polymerizable olefin consisting of aliphatic mono-1-olefins having 2 to 20 carbon atoms per molecule and conjugated dienes having from 4 to 8 carbon atoms per molecule in the presence of a cocatalyst comprising an organoaluminum compound selected from those having the formulas $R'_2AlX$, $RAlX_2$, and $R'_3Al_2X_3$ wherein R' is individually selected from linear and branched chain hydrocarbyl radicals containing 1 to 20 carbon atoms and each X is a halogen atom.

14. A process according to claim 13 wherein said cocatalyst for step (C) consists essentially of triethylaluminum.

15. A process according to claim 14 wherein said polymerizable compound comprises at least 90 weight percent ethylene.

16. A process according to claim 14 wherein said polymerizable compound consists essentially of ethylene.

17. A process according to claim 9 wherein said precipitating agent comprises a dialkyl magnesium compound.

* * * * *